US012668720B2

(12) United States Patent
Nakao et al.

(10) Patent No.: US 12,668,720 B2
(45) Date of Patent: Jun. 30, 2026

(54) ADHESIVE TAPE

(71) Applicant: NITTO DENKO CORPORATION, Ibaraki (JP)

(72) Inventors: Kota Nakao, Ibaraki (JP); Kazuki Soejima, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 179 days.

(21) Appl. No.: 17/596,595

(22) PCT Filed: Jul. 28, 2020

(86) PCT No.: PCT/JP2020/028836
§ 371 (c)(1),
(2) Date: Dec. 14, 2021

(87) PCT Pub. No.: WO2021/024849
PCT Pub. Date: Feb. 11, 2021

(65) Prior Publication Data
US 2022/0298386 A1     Sep. 22, 2022

(30) Foreign Application Priority Data

Aug. 6, 2019     (JP) ................................. 2019-144815

(51) Int. Cl.
*C09J 7/25* (2018.01)
*C09J 7/38* (2018.01)
*C09J 11/08* (2006.01)

(52) U.S. Cl.
CPC ................. *C09J 7/255* (2018.01); *C09J 7/38* (2018.01); *C09J 11/08* (2013.01); *C09J 2301/124* (2020.08); *C09J 2301/412* (2020.08)

(58) Field of Classification Search
None
See application file for complete search history.

(56) References Cited

U.S. PATENT DOCUMENTS

| | | | |
|---|---|---|---|
| 6,235,394 B1 | 5/2001 | Shimazawa et al. | |
| 7,163,597 B2 | 1/2007 | Murata et al. | |
| 7,566,498 B2 | 7/2009 | Tokumura et al. | |

(Continued)

FOREIGN PATENT DOCUMENTS

| | | |
|---|---|---|
| CN | 102405268 A | 4/2012 |
| CN | 107011820 A | 8/2017 |

(Continued)

OTHER PUBLICATIONS

"Table 6.1.1. Phsycial Constants of Hydrocarbons", Standard Handbook of Petroleum and Natural Gas Engineering, 3rd ed. Elsevier 2006.*

(Continued)

*Primary Examiner* — Scott R. Walshon
(74) *Attorney, Agent, or Firm* — Sughrue Mion, PLLC

(57) ABSTRACT

A pressure-sensitive adhesive tape of the present invention includes thermally expandable microspheres, wherein the thermally expandable microspheres are each formed of a shell and a volatile substance contained in the shell, and wherein the shell is formed of a resin having a glass transition temperature (Tg) of 120° C. or more. In one embodiment, the resin for forming the shell contains a constituent unit having a carboxyl group.

6 Claims, 1 Drawing Sheet

(56) References Cited

U.S. PATENT DOCUMENTS

| | | | | |
|---|---|---|---|---|
| 7,635,516 B2 * | 12/2009 | Arimitsu | ................... | C09J 7/22 438/464 |
| 2003/0203193 A1 | 10/2003 | Murata et al. | | |
| 2006/0063000 A1 | 3/2006 | Tokumura et al. | | |
| 2012/0034447 A1 | 2/2012 | Higuchi et al. | | |
| 2012/0040177 A1 | 2/2012 | Nakashima et al. | | |
| 2014/0363642 A1 * | 12/2014 | Kawaguchi | .......... | C09D 17/001 524/106 |
| 2017/0283540 A1 * | 10/2017 | Hatanaka | .............. | C08F 297/04 |
| 2019/0013546 A1 * | 1/2019 | Visco | ................ | H01M 10/0525 |

FOREIGN PATENT DOCUMENTS

| | | | |
|---|---|---|---|
| CN | 108504298 A | 9/2018 | |
| CN | 108884376 A | 11/2018 | |
| EP | 1 059 339 A1 | 12/2000 | |
| EP | 1 577 359 A1 | 9/2005 | |
| EP | 2 423 285 A1 | 2/2012 | |
| EP | 3441439 A1 * | 2/2019 | .............. B01J 13/14 |
| EP | 3 441 439 B1 | 2/2020 | |
| EP | 4 011 614 A1 | 6/2022 | |
| EP | 4 011 616 A1 | 6/2022 | |
| JP | 2001-3031 A | 1/2001 | |
| JP | 2001-131507 A | 5/2001 | |
| JP | 2005-97386 A | 4/2005 | |
| JP | 2013-199651 A | 10/2013 | |
| JP | 2015-168711 A | 9/2015 | |
| JP | 2017-185448 A | 10/2017 | |
| JP | 2018-9050 A | 1/2018 | |
| JP | 2018-141086 A | 9/2018 | |
| TW | 201540803 A | 11/2015 | |
| TW | 201835266 A | 10/2018 | |
| WO | 99/43758 A1 | 9/1999 | |
| WO | 2004/058910 A1 | 7/2004 | |
| WO | 2010/122942 A1 | 10/2010 | |
| WO | WO-2017175519 A1 * | 10/2017 | .............. B01J 13/14 |

OTHER PUBLICATIONS

Handbook of Thermoplastic Elastomers (2nd Edition), Table 4.31, Elsevier (Year: 2014).*

Notification of First Office Action dated Dec. 27, 2022 from the China National Intellectual Property Administration in Application No. 202080055322.X.

International Search Report for PCT/JP2020/028836 dated Sep. 8, 2020 (PCT/ISA/210).

Notice of Reasons for Refusal issued Apr. 11, 2023 in Japanese Application No. 2021-537240.

Notice of Reasons for Refusal issued Apr. 11, 2023 in Japanese Application No. 2021-537241.

Notification of Second Office Action dated Jul. 7, 2023 in CN Application No. 202080055322.X.

Evelina Waltersson, "Optimization of Expancel Product and Process Through the use of Multivariate Planning, Data Analysis and Evaluation", Department of Chemistry, 2012, XP093064109,Umea, Sweden, (43 pages).

Extended European Search Report dated Jul. 28, 2023 in EP Application No. 20850554.5.

Extended European Search Report dated Jul. 28, 2023 in EP Application No. 20849416.1.

First Office Action dated Nov. 24, 2023 issued by State Intellectual Property Office of People's Republic of Chinain Chinese Application No. 202080055315.X.

Third Office Action dated Dec. 12, 2023 issued by State Intellectual Property Office of People's Republic of China in Chinese Application No. 202080055322.X.

Taiwanese Office Action dated Jan. 23, 2024 in Application No. 109126208.

Request for the Submission of an Opinion dated Jun. 25, 2024, issued in Korean Application No. 10-2022-7003534.

Notice of Reasons for Refusal dated Jan. 28, 2025 in JP Application No. 2023-208712.

Riesen et al., "The glass transition temperature measured by different TA techniques. Part 2: Determination of glass transition temperatures", UserCom, Information for users of Mettler Toledo thermal analysis systems, Feb. 2003, XP007918757, pp. 1-20 (20 pages).

Communication dated May 8, 2025, issued in European Application No. 20 850 554.5.

Communication dated May 8, 2025, issued in European Application No. 20 849 416.1.

* cited by examiner

ADHESIVE TAPE

CROSS REFERENCE TO RELATED APPLICATIONS

This application is a National Stage of International Application No. PCT/JP2020/028836 filed Jul. 28, 2020, claiming priority based on Japanese Patent Application No. 2019-144815 filed Aug. 6, 2019.

TECHNICAL FIELD

The present invention relates to a pressure-sensitive adhesive tape. More specifically, the present invention relates to a pressure-sensitive adhesive tape capable of expressing easy peelability in response to thermal stimulation.

BACKGROUND ART

As a pressure-sensitive adhesive tape used for temporarily fixing a workpiece in a manufacturing process of an electronic part or the like, there has been known an easily peelable pressure-sensitive adhesive tape which expresses a pressure-sensitive adhesive property during temporary fixing, and which expresses peelability in such a situation that fixing is not required. As one of such pressure-sensitive adhesive tapes, a pressure-sensitive adhesive tape containing thermally expandable microspheres typified by a foaming agent in a pressure-sensitive adhesive layer has been investigated (for example, Patent Literature 1). This pressure-sensitive adhesive tape expresses a desired pressure-sensitive adhesive strength at relatively low temperature typified by normal temperature. Meanwhile, when the pressure-sensitive adhesive tape is heated to a predetermined temperature (foaming temperature) or more, the foaming agent expands, and unevenness occurs on the surface of the pressure-sensitive adhesive layer, with the result that the pressure-sensitive adhesive strength is decreased. In such pressure-sensitive adhesive tape, an adherend can also be peeled only by gravity action.

Meanwhile, in recent years, the manufacturing process and usage environment of an electronic part have been diversified, and it is assumed that the electronic part is exposed to an environment at a temperature higher than before. Thus, desired performance is required to be exhibited even under such environment. Because of this, when an electronic part is manufactured, the reliability may be evaluated by a test performed by a cycle of high-temperature conditions and low-temperature conditions, such as a thermal shock test.

Also in the thermal shock test, a pressure-sensitive adhesive tape containing a foaming agent may be used for temporarily fixing a test body. In the pressure-sensitive adhesive tape used in this manner, a foaming agent that can foam at a temperature equal to or higher than the high-temperature conditions of the thermal shock test is used, and the pressure-sensitive adhesive tape is required to have characteristics of not exhibiting peelability during the thermal shock test but exhibiting peelability by heating after the test. However, the related-art foaming agent has a problem in that the foaming temperature is decreased due to the thermal history at a temperature equal to or lower than the foaming temperature, and the pressure-sensitive adhesive strength of the pressure-sensitive adhesive tape is unnecessarily decreased during the thermal shock test.

CITATION LIST

Patent Literature

[PTL 1] JP 2001-131507 A

SUMMARY OF INVENTION

Technical Problem

The present invention has been made in order to solve the above-mentioned problems of the related art, and an object of the present invention is to provide a pressure-sensitive adhesive tape in which a decrease in foaming temperature caused by a thermal history is prevented.

Solution to Problem

According to one embodiment of the present invention, there is provided a pressure-sensitive adhesive tape, including thermally expandable microspheres, wherein the thermally expandable microspheres are each formed of a shell and a volatile substance contained in the shell, and wherein the shell is formed of a resin having a glass transition temperature (Tg) of 120° C. or more.

In one embodiment, the resin for forming the shell contains a constituent unit having a carboxyl group.

In one embodiment, a content ratio of the constituent unit having a carboxyl group is from 5 parts by weight to 97 parts by weight with respect to 100 parts by weight of the resin.

In one embodiment, an initial pressure-sensitive adhesive strength "a" of the pressure-sensitive adhesive tape, when a pressure-sensitive adhesive surface of the pressure-sensitive adhesive tape is bonded to a polyethylene terephthalate film under an ambient temperature of 25° C., is from 0.5 N/20 mm to 20 N/20 mm.

In one embodiment, a pressure-sensitive adhesive strength "b" of the pressure-sensitive adhesive tape, when a pressure-sensitive adhesive surface of the pressure-sensitive adhesive tape is bonded to a polyethylene terephthalate film after the pressure-sensitive adhesive tape is heated to 140° C. and then cooled to 25° C., is 50% or more with respect to an initial pressure-sensitive adhesive strength "a" of the pressure-sensitive adhesive tape, when the pressure-sensitive adhesive surface of the pressure-sensitive adhesive tape is bonded to the polyethylene terephthalate film under an ambient temperature of 25° C.

In one embodiment, a pressure-sensitive adhesive strength "c" of the pressure-sensitive adhesive tape, when a pressure-sensitive adhesive surface of the pressure-sensitive adhesive tape is bonded to a polyethylene terephthalate film after a cycle involving heating to 140° C. and then cooling to 25° C. is performed twice, is 50% or more with respect to an initial pressure-sensitive adhesive strength "a" of the pressure-sensitive adhesive tape, when the pressure-sensitive adhesive surface of the pressure-sensitive adhesive tape is bonded to the polyethylene terephthalate film under an ambient temperature of 25° C.

In one embodiment, the volatile substance is an organic solvent, and a difference (Tg-bp) between a boiling point (bp) of the organic solvent and the glass transition temperature (Tg) of the resin for forming the shell is 0° C. or more.

In one embodiment, the pressure-sensitive adhesive tape further includes a base material.

In one embodiment, the pressure-sensitive adhesive tape further includes another pressure-sensitive adhesive layer, wherein the base material is arranged between the pressure-sensitive adhesive layer and the another pressure-sensitive adhesive layer.

Advantageous Effects of Invention

According to the present invention, the pressure-sensitive adhesive tape in which a decrease in foaming temperature caused by a thermal history is prevented can be provided.

DESCRIPTION OF EMBODIMENTS

A. Outline of Pressure-Sensitive Adhesive Tape

Figure 1A:
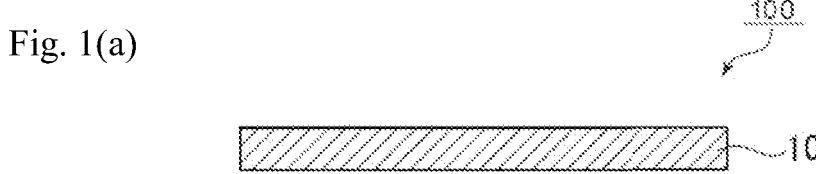
FIGS. 1(a)-1(c) are each a schematic cross-sectional view of a pressure-sensitive adhesive tape according to one embodiment of the present invention.

FIG. 1(a) is a schematic cross-sectional view of a pressure-sensitive adhesive tape according to one embodiment of the present invention. Typically, a pressure-sensitive adhesive tape 100 includes a pressure-sensitive adhesive layer 10. The pressure-sensitive adhesive tape of the present invention may consist only of the pressure-sensitive adhesive layer 10, or may further include any appropriate layer in addition to the pressure-sensitive adhesive layer.

Figure 1B:
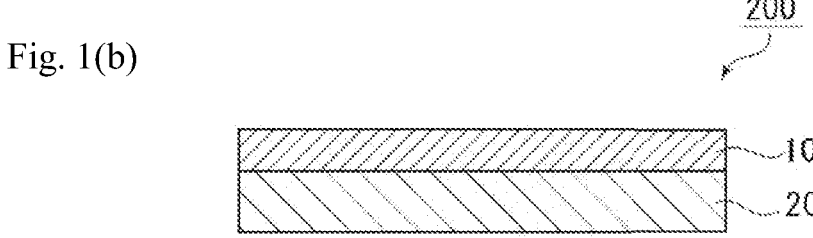
Figure 1C:
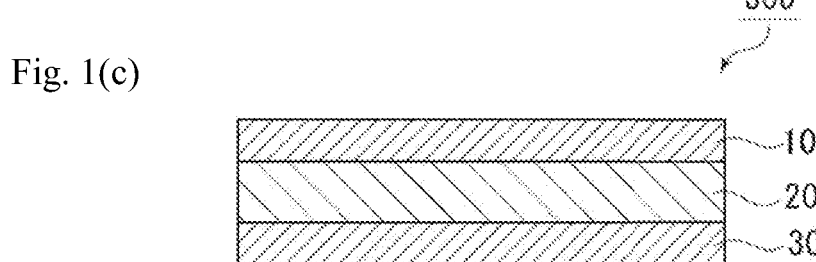

FIG. 1(b) is a schematic cross-sectional view of a pressure-sensitive adhesive tape according to another embodiment of the present invention. A pressure-sensitive adhesive tape 200 includes the pressure-sensitive adhesive layer 10 and a base material 20 arranged on at least one side of the pressure-sensitive adhesive layer 10. FIG. 1(c) is a schematic cross-sectional view of a pressure-sensitive adhesive tape according to still another embodiment of the present invention. A pressure-sensitive adhesive tape 300 includes the pressure-sensitive adhesive layer 10 and another pressure-sensitive adhesive layer 30 arranged on at least one side of the pressure-sensitive adhesive layer 10. The base material 20 may be arranged between the pressure-sensitive adhesive layer 10 and the other pressure-sensitive adhesive layer 30 as in the illustrated example, or the pressure-sensitive adhesive tape may be formed of the pressure-sensitive adhesive layer and the other pressure-sensitive adhesive layer with the base material being omitted (not shown). In addition, the pressure-sensitive adhesive tape may further include the following layers (not shown) as layers other than the pressure-sensitive adhesive layer: an elastic layer (to be described later in the section E), which is capable of imparting elasticity to the pressure-sensitive adhesive tape; a separator (to be described later in the section F), which is peelably arranged on the pressure-sensitive adhesive layer; and the like.

The pressure-sensitive adhesive tape contains thermally expandable microspheres. In one embodiment, the pressure-sensitive adhesive layer contains the thermally expandable microspheres. The thermally expandable microspheres can expand at a predetermined temperature. When the pressure-sensitive adhesive layer containing such thermally expandable microspheres is heated to a predetermined temperature or more, the thermally expandable microspheres expand, and unevenness occurs on a pressure-sensitive adhesive surface (that is, a surface of the pressure-sensitive adhesive layer), with the result that the pressure-sensitive adhesive strength is decreased or eliminated. When the pressure-sensitive adhesive tape of the present invention is used as a temporary fixing sheet for a test body or a workpiece, for example, during testing or processing of an electronic part (e.g., a ceramic capacitor), a required pressure-sensitive adhesive property is expressed in such a situation that fixing is required. After that, when the pressure-sensitive adhesive tape is peeled, the pressure-sensitive adhesive strength is decreased or eliminated by heating, and satisfactory peelability is expressed.

An initial pressure-sensitive adhesive strength "a" of the pressure-sensitive adhesive tape of the present invention, when the pressure-sensitive adhesive surface of the pressure-sensitive adhesive tape is bonded to a polyethylene terephthalate film (e.g., thickness: 25 μm) under an ambient temperature of 25° C., is preferably from 0.5 N/20 mm to 20 N/20 mm, more preferably from 0.5 N/20 mm to 18 N/20 mm, still more preferably from 1 N/20 mm to 12 N/20 mm. When the initial pressure-sensitive adhesive strength "a" falls within such ranges, for example, a pressure-sensitive adhesive tape useful as a temporary fixing sheet to be used for manufacturing an electronic part can be obtained. As used herein, the initial pressure-sensitive adhesive strength means a pressure-sensitive adhesive strength in a state in which the pressure-sensitive adhesive tape has not undergone a thermal history of 50° C. or more. In addition, the pressure-sensitive adhesive strength refers to a pressure-sensitive adhesive strength measured by a method in conformity with JIS Z 0237:2000 (bonding conditions: one pass back and forth with a 2 kg roller, peel rate: 300 mm/min, peel angle: 180°).

A pressure-sensitive adhesive strength "b" of the pressure-sensitive adhesive tape of the present invention, when the pressure-sensitive adhesive surface of the pressure-sensitive adhesive tape is bonded to the polyethylene terephthalate film (e.g., thickness: 25 μm) after the pressure-sensitive adhesive tape is heated to 140° C. and then cooled to 25° C., is preferably from 0.4 N/20 mm to 20 N/20 mm, more preferably from 0.4 N/20 mm to 17 N/20 mm, still more preferably from 0.8 N/20 mm to 16 N/20 mm, particularly preferably from 0.8 N/20 mm to 14 N/20 mm, most preferably from 0.8 N/20 mm to 12 N/20 mm.

The pressure-sensitive adhesive strength "b" of the pressure-sensitive adhesive tape of the present invention, when the pressure-sensitive adhesive surface of the pressure-sensitive adhesive tape is bonded to the polyethylene terephthalate film (e.g., thickness: 25 μm) after the pressure-sensitive adhesive tape is heated to 140° C. and then cooled to 25° C., is preferably 50% or more, more preferably 80% or more, still more preferably 90% or more with respect to the initial pressure-sensitive adhesive strength "a".

A pressure-sensitive adhesive strength "c" of the pressure-sensitive adhesive tape of the present invention, when the pressure-sensitive adhesive surface of the pressure-sensitive adhesive tape is bonded to the polyethylene terephthalate film (e.g., thickness: 25 μm) after a cycle involving heating to 140° C. and then cooling to 25° C. is performed twice, is preferably from 0.4 N/20 mm to 20 N/20 mm, more preferably from 0.4 N/20 mm to 17 N/20 mm, still more preferably from 0.8 N/20 mm to 16 N/20 mm, particularly preferably from 0.8 N/20 mm to 14 N/20 mm, most preferably from 0.8 N/20 mm to 12 N/20 mm.

The pressure-sensitive adhesive strength "c" of the pressure-sensitive adhesive tape of the present invention, when the pressure-sensitive adhesive surface of the pressure-sensitive adhesive tape is bonded to the polyethylene terephthalate film (e.g., thickness: 25 μm) after a cycle involving heating to 140° C. and then cooling to 25° C. is performed twice, is preferably 50% or more, more preferably 80% or more, still more preferably 90% or more with respect to the initial pressure-sensitive adhesive strength "a".

The thickness of the pressure-sensitive adhesive tape of the present invention is preferably from 30 μm to 500 μm, more preferably from 40 μm to 300 μm.

B. Pressure-Sensitive Adhesive Layer

As described above, in one embodiment, the pressure-sensitive adhesive layer contains the thermally expandable microspheres. Practically, the pressure-sensitive adhesive layer further contains a pressure-sensitive adhesive.

B-1. Thermally Expandable Microspheres

The thermally expandable microspheres are each formed of a shell and a volatile substance (typically, an organic solvent) contained in the shell. In the present invention, the shell is formed of a resin having a glass transition temperature (Tg) of 120° C. or more. In the present invention, through use of the thermally expandable microspheres each containing such shell, a pressure-sensitive adhesive tape in which the foaming temperatures of the thermally expandable microspheres are not easily fluctuated can be obtained. More specifically, when the related-art foaming agent is heated at a temperature equal to or lower than the foaming temperature, the foaming temperature tends to be decreased due to the thermal history. However, in the present invention, through use of the thermally expandable microspheres each containing the shell, a decrease in foaming temperature caused by a thermal history is prevented.

The glass transition temperature (Tg) of the resin for forming the shell is preferably 125° C. or more, more preferably 130° C. or more, still more preferably 135° C. or more. When the glass transition temperature (Tg) falls within such ranges, the above-mentioned effect of the present invention becomes more remarkable. The upper limit of the glass transition temperature (Tg) of the resin for forming the shell is, for example, 260° C. The glass transition temperature is determined by the Fox calculation formula. As described below, the Fox calculation formula is a relational expression between the glass transition temperature $Tg$ (° C.) of a copolymer and the glass transition temperatures $Tg_i$ (° C.) of homopolymers obtained by homopolymerization of each of monomers for forming the copolymer. In the following Fox formula, $Tg$ (° C.) represents the glass transition temperature of a copolymer, $W_i$ represents the weight fraction of a monomer i, and $Tg_i$ (° C.) represents the glass transition temperature of a homopolymer formed of the monomer i.

$$1/(273+Tg)=\Sigma(W_i/(273+Tg_i))$$

Examples of the glass transition temperature of the homopolymer formed of the monomer include: 228° C. for a methacrylic acid homopolymer; 97° C. for an acrylonitrile homopolymer; 102° C. for a methyl methacrylate homopolymer; 120° C. for a methacryloylnitrile homopolymer; 75° C. for a vinylidene chloride homopolymer; and 97° C. for an isobornyl acrylate homopolymer. In addition, as the glass transition temperature of each of the other homopolymers, the value described in "Polymer Handbook" (4th edition, John Wiley & Sons, Inc., 1999) may be used. When a plurality of Tg values are described in this literature, the value of "conventional" is adopted.

As the resin for forming the shell, for example, a resin having a constituent unit derived from a radically polymerizable monomer is used. Examples of the monomer include: nitrile monomers, such as acrylonitrile, methacrylonitrile, α-chloroacrylonitrile, α-ethoxyacrylonitrile, and fumaronitrile; carboxy group-containing monomers, such as acrylic acid, methacrylic acid, itaconic acid, maleic acid, fumaric acid, and citraconic acid; vinylidene chloride; vinyl acetate; (meth)acrylic acid esters, such as methyl (meth)acrylate, ethyl (meth)acrylate, n-butyl (meth)acrylate, isobutyl (meth) acrylate, t-butyl (meth)acrylate, isobornyl (meth)acrylate, cyclohexyl (meth)acrylate, benzyl (meth)acrylate, and β-carboxyethyl acrylate; styrene monomers, such as styrene, α-methylstyrene, and chlorostyrene; and amide monomers, such as acrylamide, a substituted acrylamide, methacrylamide, and a substituted methacrylamide. A polymer formed of such monomer may be a homopolymer, or may be a copolymer.

In one embodiment, the resin for forming the shell contains a constituent unit having a carboxyl group. When the shell is formed of a resin having a carboxyl group, the state of the molecule can be maintained even when the shell undergoes a thermal history due to the interaction between the carboxyl groups, and as a result, the effect of preventing a decrease in foaming temperature caused by a thermal history becomes remarkable. The constituent unit having a carboxyl group may be, for example, a constituent unit derived from the above-mentioned carboxy group-containing monomer. In one embodiment, the resin for forming the shell contains at least one kind selected from the group consisting of: a constituent unit having a carboxyl group; a constituent unit derived from isobornyl acrylate; a constituent unit derived from methacrylonitrile; a constituent unit derived from acrylonitrile; a constituent unit derived from methyl (meth)acrylate; and a constituent unit derived from vinylidene chloride. Preferably, the resin for forming the shell contains a constituent unit having a carboxyl group and a constituent unit derived from methacrylonitrile and/or acrylonitrile.

In the resin for forming the shell, the content ratio of the constituent unit having a carboxyl group is preferably from 5 parts by weight to 97 parts by weight, more preferably from 5 parts by weight to 90 parts by weight, still more preferably from 5 parts by weight to 85 parts by weight, particularly preferably from 5 parts by weight to 80 parts by weight, most preferably from 10 parts by weight to 75 parts by weight with respect to 100 parts by weight of the resin. When the content ratio falls within such ranges, the effect of preventing a decrease in foaming temperature caused by a thermal history can be effectively obtained, and a shell excellent in solvent resistance can be formed.

The resin for forming the shell may be a cross-linked product. Through cross-linking, the excluded free volume of a polymer can be adjusted, thereby being capable of controlling the diffusivity of the contained volatile substance, the expandability of the shell, and the like. The cross-linked product may further contain a constituent unit derived from a monomer having two or more polymerizable double bonds in a molecule thereof. In one embodiment, the above-mentioned radically polymerizable monomer and the monomer having two or more polymerizable double bonds in a molecule thereof are used in combination. Examples of the monomer having two or more polymerizable double bonds in a molecule thereof include: aromatic divinyl compounds, such as divinylbenzene and divinylnaphthalene; and allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth) acrylate, 1,9-nonanediol di(meth)acrylate, 1,10-decanediol di(meth)acrylate, PEG #200 di(meth)acrylate, PEG #400 di(meth)acrylate, PEG #600 di(meth)acrylate, neopentyl glycol di(meth)acrylate, 1,6-hexanediol di(meth)acrylate, trimethylolpropane tri(meth)acrylate, EO-modified trimethylolpropane tri(meth)acrylate, glycerin di(meth)acrylate, dimethylol-tricyclodecane di(meth)acrylate, pentaerythritol tri(meth)acrylate, pentaerythritol tetra(meth)acrylate, dipentaerythritol hexa(meth)acrylate, neopenthyl glycol benzoate acrylate, trimethylolpropane benzoate acrylate, 2-hydroxy-3-acryloyloxypropyl (meth)acrylate, neopentyl glycol hydroxypivalate di(meth)acrylate, ditrimethylolpropane tetra(meth)acrylate, 2-butyl-2-ethyl-1,3-propanediol di(meth)acrylate, polytetramethylene glycol di(meth)acrylate, a phenyl glycidyl ether acrylate hexamethylene diisocyanate urethane prepolymer, a phenyl glycidyl ether acrylate toluene diisocyanate urethane prepolymer, a pentaerythritol triacrylate hexamethylene diisocyanate urethane prepolymer, a pentaerythritol triacrylate toluene diisocyanate urethane prepolymer, and a pentaerythritol triacrylate isophorone diisocyanate urethane prepolymer.

The thickness of the shell is preferably from 1 μm to 15 μm, more preferably from 1 μm to 7 μm, still more preferably from 1 μm to 5 μm.

The volatile substance contained in the shell is typically an organic solvent. Examples of the organic solvent include linear aliphatic hydrocarbons each having 3 to 8 carbon atoms and fluorinated products thereof, branched aliphatic hydrocarbons each having 3 to 8 carbon atoms and fluorinated products thereof, linear alicyclic hydrocarbons each having 3 to 8 carbon atoms and fluorinated products thereof, ether compounds each having a hydrocarbon group having 2 to 8 carbon atoms, and compounds in each of which part of a hydrogen atom of the hydrocarbon group is substituted with a fluorine atom. In one embodiment, a hydrocarbon formed only of a hydrogen atom and a carbon atom, such as propane, cyclopropane, butane, cyclobutane, isobutane, pentane, cyclopentane, neopentane, isopentane, hexane, cyclohexane, dimethylhexane, 2-methylpentane, 2,2-dimethylbutane, heptane, cycloheptane, octane, cyclooctane, isooctane, methylheptane, or trimethylpentane, or a hydrofluoro ether, such as $C_3F_7OCH_3$, $C_4F_9OCH_3$, or $C_4F_9OC_2H_5$, is used as the organic solvent. Those organic solvents may be used alone or in combination thereof. The organic solvent has advantages in that the organic solvent has low affinity with the resin for forming the shell and/or the pressure-sensitive adhesive, does not easily dissolve the shell and/or the pressure-sensitive adhesive, and does not easily change physical properties such as thermal properties. In addition, a hydrocarbon formed only of a hydrogen atom and a carbon atom is preferred from the viewpoint of industrial use.

In one embodiment, as the hydrocarbon formed only of a hydrogen atom and a carbon atom, a branched hydrocarbon (e.g., isobutane or isopentane) is used. The branched hydrocarbon is not easily charged, and when this solvent is used, accidents such as ignition caused by charging can be prevented.

The boiling point of the organic solvent is preferably from −50° C. to 100° C., more preferably from −20° C. to 100° C. When the boiling point falls within such ranges, thermally expandable microspheres in each of which the shell can expand satisfactorily without being broken can be obtained. When the boiling point of the organic solvent is too low, there is a risk in that the operation for suppressing volatilization during the production of the thermally expandable microspheres may become complicated.

A difference (Tg-bp) between the boiling point (bp) of the organic solvent and the glass transition temperature (Tg) of the resin for forming the shell is preferably 0° C. or more, more preferably from 0° C. to 200° C., still more preferably from 50° C. to 150° C. When an organic solvent having a boiling point higher than the glass transition temperature of the shell is used, the shell is destroyed by the pressure generated when the organic solvent is heated, and further, the pressure-sensitive adhesive is scattered. Thus, there is a risk in that the function and effect expected in the invention of the present application may be hindered. When two or more kinds of organic solvents (mixed solvent) are used, the "boiling point (bp) of the organic solvent" is a value calculated by (sum of boiling points of organic solvents)/(number of kinds of organic solvents).

The content ratio of the organic solvent is preferably from 5 wt % to 35 wt %, more preferably from 10 wt % to 30 wt % with respect to the weight of the thermally expandable microspheres before heating. When the content ratio falls within such ranges, a pressure-sensitive adhesive tape in which the thermally expandable microspheres are dispersed in the pressure-sensitive adhesive layer with high uniformity can be obtained. When the content ratio is less than 5 wt %, the thermally expandable microspheres are liable to be unevenly distributed on the surface of the pressure-sensitive adhesive layer during the production of the pressure-sensitive adhesive layer for the reason of low density and the like, and there is a risk in that excessively large unevenness may occur on the surface of the pressure-sensitive adhesive layer after heating. When the content ratio is more than 35 wt %, the density is high, and the thermally expandable microspheres are settled. Accordingly, even with heating, sufficient unevenness may not occur on the surface of the pressure-sensitive adhesive layer, and there is a risk in that desired peelability may not be obtained and there is also a risk in that an adhesive residue may occur.

Under an ambient temperature of 25° C., the average (number average) particle diameter of the thermally expandable microspheres before the foaming of the thermally expandable microspheres is preferably from 50 μm to 30 μm, more preferably from 5 μm to 28 μm, still more preferably from 10 μm to 25 μm. When the average particle diameter falls within such ranges, thermally expandable microspheres having high dispersibility in the pressure-sensitive adhesive layer can be obtained. The pressure-sensitive adhesive layer containing the thermally expandable microspheres in a highly dispersed state has high uniformity of unevenness caused by heating and can express excellent peelability. The average particle diameter of the thermally expandable microspheres may be controlled, for example, by the conditions for polymerizing the thermally expandable microspheres (detail thereof is described later). The average particle diameter may be measured by a particle size distribution measurement method in a laser scattering method. More specifically, the average particle diameter may be measured using a particle size distribution measurement apparatus (e.g., product name "SALD-2000J" manufactured by Shimadzu Corporation) after the thermally expandable microspheres to be used have been dispersed in a predetermined solvent (e.g., water).

In one embodiment, the content ratio of the thermally expandable microspheres is represented by the area ratio of the thermally expandable microspheres measured in a sectional surface. When the sectional area of the pressure-sensitive adhesive layer in a predetermined sectional surface is represented by A, and the sectional area of the thermally expandable microspheres in the sectional surface is represented by B, the ratio of the sectional area B of the thermally expandable microspheres is preferably from 3% to 75%, more preferably from 3.5% to 70% with respect to the sectional area A of the pressure-sensitive adhesive layer. In the case where the ratio of the sectional area B is less than 3%, even when the thermally expandable microspheres are expanded by heating, the unevenness that occurs on the surface of the pressure-sensitive adhesive layer is insufficient, and there is a risk in that desired peelability may not be obtained. Meanwhile, when the ratio of the sectional area B is more than 75%, a change in volume of the pressure-sensitive adhesive layer becomes too large, and there is a risk in that floating and peeling may occur between the base material and the pressure-sensitive adhesive layer. In addition, the content ratio of the pressure-sensitive adhesive in the pressure-sensitive adhesive layer is low, and there is a risk in that a desired pressure-sensitive adhesive strength may not be obtained. The ratio of the sectional area B of the thermally expandable microspheres may be determined by appropriately processing an image obtained by observing a sectional surface of the pressure-sensitive adhesive layer with an electron microscope (e.g., product name "S-3400N low vacuum scanning electron microscope" manufactured by Hitachi High-Tech Corporation). For example, the ratio of the sectional area B of the thermally expandable microspheres may be determined by outputting the image on paper and substituting a paper weight "a" of the pressure-sensitive adhesive layer portion (that is, the entire pressure-sensitive adhesive layer containing the thermally expandable microspheres) and a weight "b" of the paper obtained by cutting out only the thermally expandable microsphere portion into the expression: b/a×100.

The content ratio of the thermally expandable microspheres is preferably from 20 parts by weight to 80 parts by weight, more preferably from 20 parts by weight to 60 parts by weight, still more preferably from 20 parts by weight to 50 parts by weight with respect to 100 parts by weight of the pressure-sensitive adhesive layer. When the content ratio falls within such ranges, the ratio of the sectional area B of the thermally expandable microspheres as described above can be achieved. In addition, in order to prevent the thermally expandable microspheres from being unevenly distributed in the pressure-sensitive adhesive layer while setting the content ratio of the thermally expandable microspheres within the above-mentioned ranges, the sectional area B of the thermally expandable microspheres can be set within the preferred ranges by performing an operation involving, for example, stirring a composition for forming the pressure-sensitive adhesive layer until right before an application step. The content ratio of the thermally expandable microspheres is determined by the following expression. The weight of the thermally expandable microspheres is determined by measuring the weight of the thermally expandable microspheres extracted from the pressure-sensitive adhesive layer.

> Content ratio (wt %) of thermally expandable microspheres=weight of thermally expandable microspheres/weight of pressure-sensitive adhesive layer×100

The thermally expandable microspheres may be produced by any appropriate method. In one embodiment, the thermally expandable microspheres are obtained by a suspension polymerization method. The suspension polymerization is usually performed by dispersing a monomer (shell-forming material) and an organic solvent in an aqueous dispersion medium containing a dispersant and polymerizing the monomer in the presence of the organic solvent. In addition, a dispersion stabilizer for stabilizing the dispersion may also be utilized. Examples of the dispersion stabilizer in the aqueous dispersion medium include inorganic fine particles, such as silica, magnesium hydroxide, calcium phosphate, and aluminum hydroxide. In addition, for example, a condensation product of diethanolamine and an aliphatic dicarboxylic acid, polyvinylpyrrolidone, methylcellulose, polyethylene oxide, polyvinyl alcohol, or various emulsifiers may be used as a dispersion stabilization aid.

The characteristics of the thermally expandable microspheres, such as the particle diameter and the content of the organic solvent, may be controlled by the polymerization conditions of the suspension polymerization, the kinds and addition amounts of mixed components, and the like. For example, thermally expandable microspheres each having a large particle diameter can be obtained by an operation involving, for example, reducing the addition amount of the dispersant or decreasing the stirring speed during polymerization. In addition, when the blending amount of the monomer is increased, or the stirring speed during polymerization is decreased, thermally expandable microspheres each containing a shell having a large thickness can be obtained.

B-2. Pressure-Sensitive Adhesive

As the pressure-sensitive adhesive for forming the pressure-sensitive adhesive layer, any appropriate pressure-sensitive adhesive may be used as long as the effect of the present invention is obtained. Examples of the pressure-sensitive adhesive include an acrylic pressure-sensitive adhesive, a silicone-based pressure-sensitive adhesive, a vinyl alkyl ether-based pressure-sensitive adhesive, a polyester-based pressure-sensitive adhesive, a polyamide-based pressure-sensitive adhesive, a urethane-based pressure-sensitive adhesive, a fluorine-based pressure-sensitive adhesive, a styrene-diene block copolymer-based pressure-sensitive adhesive, and an activity energy ray-curable pressure-sensitive adhesive. Of those, an acrylic pressure-sensitive adhesive, a rubber-based pressure-sensitive adhesive, or a silicone-based pressure-sensitive adhesive is preferred, and an acrylic pressure-sensitive adhesive is more preferred.

The gel fraction of the pressure-sensitive adhesive is preferably from 20 wt % to 100 wt %, more preferably from 30 wt % to 99 wt %, still more preferably from 50 wt % to 99 wt %. In the case where the gel fraction is less than 20 wt %, even when the thermally expandable microspheres expand to cause unevenness on the surface of the pressure-sensitive adhesive layer, there is a risk in that the pressure-sensitive adhesive layer may flow to cause the unevenness to disappear in a short period of time. Meanwhile, when the gel fraction is more than 99 wt %, the heating expansion of the thermally expandable microspheres is hindered to prevent sufficient unevenness from occurring. Even when the unevenness occurs, the phenomenon, for example, in which the thermally expandable microspheres explode to scatter the shell of each of the thermally expandable microspheres and the surrounding pressure-sensitive adhesive layer occurs, and there is a risk in that an adhesive residue property may be aggravated. The gel fraction of the pressure-sensitive adhesive may be controlled by adjusting the composition of a base polymer for forming the pressure-sensitive adhesive, the kind and content of a cross-linking agent to be added to the pressure-sensitive adhesive, the kind and content of a tackifier, and the like. A method of measuring the gel fraction is as described below.

About 0.1 g of a pressure-sensitive adhesive was sampled and precisely weighed (weight of a sample). The sample was wrapped in a mesh-like sheet (product name "NTF-1122" manufactured by Nitto Denko Corporation) and then immersed in about 50 ml of toluene at room temperature for 1 week. After that, a solvent-insoluble content (content in the mesh-like sheet) is taken out from toluene and dried at 70° C. for about 2 hours. The dried solvent-insoluble content is weighed (weight after immersion and drying), and a gel fraction (wt %) is calculated by the following expression (a).

$$\text{Gel fraction (wt \%)}=[(\text{weight after immersion and drying})/(\text{weight of sample})]\times 100 \qquad (a)$$

It is preferred that the base polymer contained in the pressure-sensitive adhesive have a OH group or a COOH group. This is because, when such base polymer is used, the gel fraction can be adjusted through use of a cross-linking agent. In addition, the cohesion of the base polymer caused by the intermolecular force, such as hydrogen bonding, can be adjusted by the amount of the OH group or the COOH group that does not react with the cross-linking agent. With this configuration, the shape of the unevenness on the surface of the pressure-sensitive adhesive layer caused by the expansion of the thermally expandable microspheres and the shell permeability of the organic solvent contained in the thermally expandable microspheres can be controlled.

The acid value of the base polymer is preferably from 0 to 100, more preferably from 0 to 75, still more preferably from 0 to 50. The acid value of the polymer in the pressure-sensitive adhesive layer may be measured by extracting the solvent-soluble content in the pressure-sensitive adhesive layer. Specifically, the solvent-soluble content may be extracted by the following method.

(i) The pressure-sensitive adhesive layer is put into a solvent to prepare a solution sample in which the solvent-soluble content in the pressure-sensitive adhesive layer is dissolved in the solvent.

In consideration of, for example, polarity, any one kind of solvent selected from, for example, chloroform ($CHCl_3$), methylene chloride ($CH_2Cl_2$), tetrahydrofuran (THF), acetone, dimethyl sulfoxide (DMSO), N,N-dimethylformamide (DMF), methanol, ethanol, toluene, and water, or a mixed solvent including two or more kinds thereof at an appropriate ratio may be used as the solvent.

Typically, about 30 mL of a solvent is added to about 0.2 g of the pressure-sensitive adhesive layer, and the mixture is stirred in a temperature range of from room temperature to around the boiling point of the solvent to be used for from about 30 minutes to about 12 hours. As required, for example, when the extraction efficiency of a component to be analyzed is low, a solution sample may also be prepared by repeating, once or a plurality of times, an operation involving separating the solution, newly adding a solvent in approximately the same amount as that of the separated solution to the sample after the solution is separated, followed by stirring, and separating the resultant solution.

(ii) The solvent is removed from the solution sample by a method such as evaporation, and thus, a solvent-soluble polymer can be taken out.

The solvent-soluble polymer may contain a solvent-soluble content that is not to be measured, such as a low molecular weight component of an unreacted cross-linking agent. In this case, a solvent-soluble polymer formed only of a measurement target is prepared by a method involving pouring the solution sample into a solvent that does not dissolve only a polymer component (reprecipitation method), molecular weight fractionation by gel filtration chromatography using the solution sample (preparative liquid chromatography method), or the like.

(Acrylic Pressure-Sensitive Adhesive)

An example of the acrylic pressure-sensitive adhesive is an acrylic pressure-sensitive adhesive containing, as a base polymer, an acrylic polymer (homopolymer or copolymer) using one or two or more kinds of (meth)acrylic acid alkyl esters as a monomer component. Specific examples of the (meth)acrylic acid alkyl ester include (meth)acrylic acid C1-20 alkyl esters, such as methyl (meth)acrylate, ethyl (meth)acrylate, propyl (meth)acrylate, isopropyl (meth) acrylate, butyl (meth)acrylate, isobutyl (meth)acrylate, s-butyl (meth)acrylate, t-butyl (meth)acrylate, pentyl (meth) acrylate, hexyl (meth) acrylate, heptyl (meth)acrylate, octyl (meth)acrylate, 2-ethylhexyl (meth)acrylate, isooctyl (meth) acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth) acrylate, hexadecyl (meth) acrylate, heptadecyl (meth) acrylate, octadecyl (meth) acrylate, nonadecyl (meth)acrylate, and eicosyl (meth)acrylate. Of those, a (meth)acrylic acid alkyl ester having a linear or branched alkyl group having 4 to 18 carbon atoms may be preferably used.

The acrylic polymer may contain a unit corresponding to any other monomer copolymerizable with the (meth)acrylic acid alkyl ester, as required, for the purpose of modification of cohesive strength, heat resistance, cross-linkability, or the like. Examples of such monomer include: carboxyl group-containing monomers, such as acrylic acid, methacrylic acid, carboxyethyl acrylate, carboxypentyl acrylate, itaconic acid, maleic acid, fumaric acid, and crotonic acid; acid anhydride monomers, such as maleic anhydride and itaconic anhydride; hydroxyl group-containing monomers, such as hydroxyethyl (meth) acrylate, hydroxypropyl (meth)acrylate, hydroxybutyl (meth) acrylate, hydroxyhexyl (meth) acrylate, hydroxyoctyl (meth) acrylate, hydroxydecyl (meth) acrylate, hydroxylauryl (meth) acrylate, and (4-hydroxymethylcyclohexyl)methyl methacrylate; sulfonic acid group-containing monomers, such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; (N-substituted) amide-based monomers, such as (meth)acrylamide, N,N-dimethyl(meth)acrylamide, N-butyl(meth)acrylamide, N-methylol (meth)acrylamide, and N-methylolpropane (meth)acrylamide; aminoalkyl (meth)acrylate-based monomers, such as aminoethyl (meth) acrylate, N,N-dimethylaminoethyl (meth)acrylate, and t-butylaminoethyl (meth)acrylate; alkoxyalkyl (meth)acrylate-based monomers, such as methoxyethyl (meth)acrylate and ethoxyethyl (meth)acrylate; maleimide-based monomers, such as N-cyclohexylmaleimide, N-isopropylmaleimide, N-laurylmaleimide, and N-phenylmaleimide; itaconimide-based monomers, such as N-methyl itaconimide, N-ethyl itaconimide, N-butyl itaconimide, N-octyl itaconimide, N-2-ethylhexyl itaconimide, N-cyclohexyl itaconimide, and N-lauryl itaconimide; succinimide-based monomers, such as N-(meth)acryloyloxymethylene succinimide, N-(meth)acryloyl-6-oxyhexamethylene succinimide, and N-(meth)acryloyl-8-oxyoctamethylene succinimide; vinyl-based monomers, such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers, such as acrylonitrile and methacrylonitrile; epoxy group-containing acrylic monomers, such as glycidyl (meth)acrylate; glycol-based acrylic ester monomers, such as polyethylene glycol (meth) acrylate, polypropylene glycol (meth) acrylate, methoxyethylene glycol (meth)acrylate, and methoxypolypropylene glycol (meth)acrylate; acrylic ester-based monomers each having, for example, a heterocycle, a halogen atom, or a silicon atom, such as tetrahydrofurfuryl (meth)acrylate, fluorine (meth)acrylate, and silicone (meth)acrylate; polyfunctional monomers, such as hexanediol di(meth)acrylate, (poly)ethylene glycol di(meth) acrylate, (poly)propylene glycol di(meth)acrylate, neopentyl glycol di(meth)acrylate, pentaerythritol di(meth)acrylate, trimethylolpropane tri(meth)acrylate, pentaerythritol tri (meth)acrylate, dipentaerythritol hexa(meth)acrylate, epoxy acrylate, polyester acrylate, and urethane acrylate; olefin-based monomers, such as isoprene, butadiene, and isobutylene; and vinyl ether-based monomers, such as vinyl ether. Those monomers may be used alone or in combination thereof.

(Silicone-Based Pressure-Sensitive Adhesive)

As the silicone-based pressure-sensitive adhesive, any appropriate pressure-sensitive adhesive may be used as long as the effect of the present invention is obtained. As the silicone-based pressure-sensitive adhesive, for example, a silicone-based pressure-sensitive adhesive containing, as a base polymer, for example, a silicone rubber or a silicone resin containing an organopolysiloxane is preferably used. As the base polymer for forming the silicone-based pressure-sensitive adhesive, a base polymer obtained by cross-linking the silicone rubber or the silicone resin may be used. As used herein, the "silicone rubber" means a polymer (e.g., viscosity: 1,000 Pas) in which a diorganosiloxane (D unit) serving as a main component is linearly connected, and the "silicone resin" means a polymer formed of a triorganosil-hemioxane (M unit) and a silicate (Q unit) serving as main components ("Material design and functionalization of pressure-sensitive adhesive (film/tape)", Technical Information Institute Co., Ltd., published on Sep. 30, 2009).

An example of the silicone rubber is an organopolysiloxane containing dimethylsiloxane as a constituent unit. A functional group (e.g., a vinyl group) may be introduced into the organopolysiloxane, as required. The weight average molecular weight of the organopolysiloxane is preferably from 100,000 to 1,000,000, more preferably from 150,000 to 500,000. The weight average molecular weight may be measured by GPC (solvent: THF).

An example of the silicone resin is an organopolysiloxane containing at least one kind of constituent unit selected from an $R_3SiO_{1/2}$ constituent unit, a $SiO_2$ constituent unit, an $RSiO_{3/2}$ constituent unit, and an $R_2SiO$ constituent unit (R represents a monovalent hydrocarbon group or a hydroxyl group).

The silicone rubber and the silicone resin may be used in combination. The weight ratio (rubber:resin) between the silicone rubber and the silicone resin in the silicone-based pressure-sensitive adhesive is preferably from 100:0 to 100:220, more preferably from 100:0 to 100:180, still more preferably from 100:10 to 100:100. The silicone rubber and the silicone resin may be contained in the silicone-based pressure-sensitive adhesive merely as a mixture, or may be contained in the silicone-based pressure-sensitive adhesive in the form in which the silicone rubber and the silicone resin are partially condensed with each other. The rubber: resin ratio may be determined also from the ratio between the Q unit (resin) and the D unit (rubber) obtained by measuring the composition of the silicone-based pressure-sensitive adhesive by $^{29}Si$—NMR.

(Rubber-Based Pressure-Sensitive Adhesive)

As the rubber-based pressure-sensitive adhesive, any appropriate pressure-sensitive adhesive may be used as long as the effect of the present invention is obtained. For example, a rubber-based pressure-sensitive adhesive including, as a base polymer, a natural rubber, or a synthetic rubber, such as a polyisoprene rubber, a butadiene rubber, a styrene-butadiene (SB) rubber, a styrene-isoprene (SI) rubber, a styrene-isoprene-styrene block copolymer (SIS) rubber, a styrene-butadiene-styrene block copolymer (SBS) rubber, a styrene-ethylene-butylene-styrene block copolymer (SEBS) rubber, a styrene-ethylene-propylene-styrene block copolymer (SEPS) rubber, a styrene-ethylene-propylene block copolymer (SEP) rubber, a recycled rubber, a butyl rubber, a polyisobutylene rubber, or a modified product thereof, is preferably used as the rubber-based pressure-sensitive adhesive.

(Additive)

The pressure-sensitive adhesive may contain any appropriate additive as required. Examples of the additive include a cross-linking agent, a tackifier, a plasticizer, a pigment, a dye, a filler, an age resistor, a conductive material, an antistatic agent, a UV absorber, a light stabilizer, a peeling modifier, a softener, a surfactant, a flame retardant, and an antioxidant.

Any appropriate tackifier is used as the tackifier. For example, a tackifying resin is used as the tackifier. Specific examples of the tackifying resin include a rosin-based tackifying resin (such as unmodified rosin, modified rosin, a rosin phenol-based resin, or a rosin ester-based resin), a terpene-based tackifying resin (such as a terpene-based resin, a terpene phenol-based resin, a styrene-modified terpene-based resin, an aromatic modified terpene-based resin, or a hydrogenated terpene-based resin), a hydrocarbon-based tackifying resin (such as an aliphatic hydrocarbon resin, an aliphatic cyclic hydrocarbon resin, an aromatic hydrocarbon resin (e.g., a styrene-based resin or a xylene-based resin), an aliphatic/aromatic petroleum resin, an aliphatic/alicyclic petroleum resin, a hydrogenated hydrocarbon resin, a coumarone-based resin, or a coumarone indene-based resin), a phenol-based tackifying resin (such as an alkylphenol-based resin, a xylene formaldehyde-based resin, resol, or novolac), a ketone-based tackifying resin, a polyamide-based tackifying resin, an epoxy-based tackifying resin, and an elastomer-based tackifying resin.

The addition amount of the tackifier is preferably from 5 parts by weight to 100 parts by weight, more preferably from 10 parts by weight to 50 parts by weight with respect to 100 parts by weight of the base polymer.

Examples of the cross-linking agent include an isocyanate-based cross-linking agent, an epoxy-based cross-linking agent, a melamine-based cross-linking agent, a peroxide-based cross-linking agent, a urea-based cross-linking agent, a metal alkoxide-based cross-linking agent, a metal chelate-based cross-linking agent, a metal salt-based cross-linking agent, a carbodiimide-based cross-linking agent, an oxazoline-based cross-linking agent, an aziridine-based cross-linking agent, and an amine-based cross-linking agent. Of those, an isocyanate-based cross-linking agent or an epoxy-based cross-linking agent is preferred.

Specific examples of the isocyanate-based cross-linking agent include: lower aliphatic polyisocyanates, such as butylene diisocyanate and hexamethylene diisocyanate; alicyclic isocyanates, such as cyclopentylene diisocyanate, cyclohexylene diisocyanate, and isophorone diisocyanate; aromatic isocyanates, such as 2,4-tolylene diisocyanate, 4,4'-diphenylmethane diisocyanate, and xylylene diisocyanate; and isocyanate adducts, such as a trimethylolpropane/tolylene diisocyanate trimer adduct (manufactured by Nippon Polyurethane Industry Co., Ltd., product name "Coronate L"), a trimethylolpropane/hexamethylene diisocyanate trimer adduct (manufactured by Nippon Polyurethane Industry Co., Ltd., product name "Coronate HL"), and an isocyanurate form of hexamethylene diisocyanate (manufactured by Nippon Polyurethane Industry Co., Ltd., product name "Coronate HX"). The content of the isocyanate-based cross-linking agent may be set to any appropriate amount depending on, for example, the desired pressure-sensitive adhesive strength and the elasticity of the pressure-sensitive adhesive layer, and is typically from 0.1 part by weight to 20 parts by weight, preferably from 0.5 part by weight to 10 parts by weight with respect to 100 parts by weight of the base polymer.

Examples of the epoxy-based cross-linking agent include N,N,N',N'-tetraglycidyl-m-xylenediamine, diglycidylaniline, 1,3-bis(N,N-glycidylaminomethyl)cyclohexane (manufactured by Mitsubishi Gas Chemical Company, Inc., product name "TETRAD-C"), 1,6-hexanediol diglycidyl ether (manufactured by Kyoeisha Chemical Co., Ltd., product name "Epolite 1600"), neopentyl glycol diglycidyl ether (manufactured by Kyoeisha Chemical Co., Ltd., product name "Epolite 1500NP"), ethylene glycol diglycidyl ether (manufactured by Kyoeisha Chemical Co., Ltd., product name "Epolite 40E"), propylene glycol diglycidyl ether (manufactured by Kyoeisha Chemical Co., Ltd., product name "Epolite 70P"), polyethylene glycol diglycidyl ether (manufactured by NOF Corporation, product name "EPIOL E-400"), polypropylene glycol diglycidyl ether (manufactured by NOF Corporation, product name "EPIOL P-200"), sorbitol polyglycidyl ether (manufactured by Nagase ChemteX Corporation, product name "Denacol EX-611"), glycerol polyglycidyl ether (manufactured by Nagase ChemteX Corporation, product name "Denacol EX-314"), pentaerythritol polyglycidyl ether, polyglycerol polyglycidyl ether (manufactured by Nagase ChemteX Corporation, product name "Denacol EX-512"), sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcin diglycidyl ether, bisphenol-S-diglycidyl ether, and an epoxy-based resin having two or more epoxy groups in a molecule thereof. The content of the epoxy-based cross-linking agent may be set to any appropriate amount depending on, for example, the desired pressure-sensitive adhesive strength and the elasticity of the pressure-sensitive adhesive layer, and is typically from 0.01 part by weight to 10 parts by weight, preferably from 0.03 part by weight to 5 parts by weight with respect to 100 parts by weight of the base polymer.

Any appropriate plasticizer may be used as the plasticizer. Specific examples of the plasticizer include a trimellitic acid ester-based plasticizer, a pyromellitic acid ester-based plasticizer, a polyester-based plasticizer, and an adipic acid-based plasticizer. Of those, a trimellitic acid ester-based plasticizer (e.g., tri(n-octyl) trimellitate or tri(2-ethylhexyl) trimellitate), or a pyromellitic acid ester-based plasticizer (e.g., tetra(n-octyl) pyromellitate or tetra(2-ethylhexyl) pyromellitate) is preferred. Those plasticizers may be used alone or in combination thereof. The content of the plasticizer is preferably from 1 part by weight to 20 parts by weight, more preferably from 1 part by weight to 5 parts by weight with respect to 100 parts by weight of the base polymer.

B-3. Characteristics of Pressure-Sensitive Adhesive Layer

The modulus of elasticity of the pressure-sensitive adhesive layer at 23° C. by a nanoindentation method is preferably from 0.1 MPa to 500 MPa, more preferably from 0.5 MPa to 400 MPa. The modulus of elasticity by the nanoindentation method is determined from an applied load-indentation depth curve obtained by continuously measuring, during loading and unloading, an applied load to an indenter and an indentation depth when the indenter is pushed into the pressure-sensitive adhesive layer, using, as a measurement target, a portion which is on an inner side of about 3 μm from the surface of the pressure-sensitive adhesive layer and in which the thermally expandable microspheres are not present (portion separated by 1 μm or more from the surface of the shell of each of the thermally expandable microspheres). As used herein, the modulus of elasticity by the nanoindentation method refers to a modulus of elasticity measured as described above by setting the measurement conditions to a loading/unloading speed of 1,000 nm/s and an indentation depth of 800 nm.

The arithmetic mean height Sa of the pressure-sensitive adhesive layer before the foaming of the thermally expandable microspheres under an ambient temperature of 25° C. is preferably 500 nm or less, more preferably 400 nm or less, still more preferably 300 nm or less. When the arithmetic mean height Sa falls within such ranges, a pressure-sensitive adhesive tape which can reduce the unevenness that occurs on a bonded surface of an adherend can be obtained. The arithmetic mean height Sa may be measured with a laser microscope (LEXT OLS-4000 manufactured by Olympus Corporation, image magnification: 432 times, measurement area: 640 μm×640 μm (sampling rate: 0.625 μm) in conformity with JIS B 0601:1994).

The thickness of the pressure-sensitive adhesive layer is preferably from 5 μm to 300 μm, more preferably from 5 μm to 250 μm, still more preferably from 5 μm to 100 μm, particularly preferably from 5 μm to 60 μm.

B-4. Other Components

The pressure-sensitive adhesive layer may further contain any appropriate other components as long as the effect of the present invention is obtained. Example of the other components include beads. Examples of the beads include glass beads and resin beads. Through addition of such beads to the pressure-sensitive adhesive layer, the modulus of elasticity of the pressure-sensitive adhesive layer can be improved, and a pressure-sensitive adhesive tape which enables a workpiece to be processed with higher accuracy can be obtained. The average particle diameter of the beads is, for example, from 0.01 μm to 50 μm. The addition amount of the beads is, for example, from 10 parts by weight to 200 parts by weight, preferably from 20 parts by weight to 100 parts by weight with respect to 100 parts by weight of the pressure-sensitive adhesive layer.

C. Base Material

Examples of the base material include a resin sheet, a nonwoven fabric, paper, metal foil, a woven fabric, a rubber sheet, a foamed sheet, and laminates thereof (particularly a laminate containing a resin sheet). As a resin for forming the resin sheet, there are given, for example, polyethylene terephthalate (PET), polyethylene naphthalate (PEN), polybutylene terephthalate (PBT), polyethylene (PE), polypropylene (PP), an ethylene-propylene copolymer, an ethylene-vinyl acetate copolymer (EVA), polyamide (nylon), wholly aromatic polyamide (aramid), polyimide (PI), polyvinyl chloride (PVC), polyphenylene sulfide (PPS), a fluorine-based resin, and polyether ether ketone (PEEK). Examples of the non-woven fabric include: non-woven fabrics of natural fibers each having heat resistance, such as a non-woven fabric containing Manila hemp; and non-woven fabrics of synthetic resins, such as a non-woven fabric of a polypropylene resin, a non-woven fabric of a polyethylene resin, and a non-woven fabric of an ester-based resin. Examples of the metal foil include copper foil, stainless-steel foil, and aluminum foil. Examples of the paper include Japanese paper and kraft paper.

The thickness of the base material may be set to any appropriate thickness depending on, for example, desired strength or flexibility, and intended use. The thickness of the base material is preferably 1,000 μm or less, more preferably from 1 μm to 1,000 μm, still more preferably from 1 μm to 500 μm, particularly preferably from 3 μm to 300 μm, most preferably from 5 μm to 250 μm.

The base material may be subjected to surface treatment. Examples of the surface treatment include corona treatment, chromic acid treatment, ozone exposure, flame exposure, high-voltage electric shock exposure, ionizing radiation treatment, and coating treatment with an undercoating agent.

Examples of the organic coating material include materials described in Plastic Hard Coat Material II (CMC Publishing Co., Ltd., (2004)). A urethane-based polymer is preferably used, and polyurethane acrylate, polyester polyurethane, or a precursor thereof is more preferably used. This is because of the following reasons: any such material can be easily coated and applied onto the base material; and many kinds of the material can be industrially selected and are each available at low cost. The urethane-based polymer is, for example, a polymer formed of a reacted mixture of an isocyanate monomer and an alcoholic hydroxy group-containing monomer (e.g., a hydroxy group-containing acrylic compound or a hydroxy group-containing ester compound). The organic coating material may contain, as an optional additive, a chain extender, such as polyamine, an age resistor, an oxidation stabilizer, or the like. The thickness of an organic coating layer is not particularly limited, but is suitably, for example, from about 0.1 μm to about μm, preferably from about 0.1 μm to about 5 μm, more preferably from about 0.5 μm to about 5 μm.

D. Other Pressure-Sensitive Adhesive Layer

Any appropriate pressure-sensitive adhesive layer may be formed as the other pressure-sensitive adhesive layer. As a pressure-sensitive adhesive for forming the other pressure-sensitive adhesive layer, there are given, for example, a rubber-based pressure-sensitive adhesive, an acrylic pressure-sensitive adhesive, a vinyl alkyl ether-based pressure-sensitive adhesive, a silicone-based pressure-sensitive adhesive, a polyester-based pressure-sensitive adhesive, a polyamide-based pressure-sensitive adhesive, a urethane-based pressure-sensitive adhesive, a fluorine-based pressure-sensitive adhesive, and a styrene-diene block copolymer-based pressure-sensitive adhesive. The pressure-sensitive adhesive may have blended therein, for example, a known or commonly used additive, such as a plasticizer, a filler, a surfactant, an age resistor, or a tackifier. In addition, the other pressure-sensitive adhesive layer may have a configuration as described in the section B.

The thickness of the other pressure-sensitive adhesive layer is preferably 300 μm or less, more preferably from 1 μm to 300 μm, still more preferably from 5 μm to 100 μm.

E. Elastic Layer

The pressure-sensitive adhesive tape of the present invention may further include an elastic layer. The elastic layer may be arranged on one surface of the pressure-sensitive adhesive layer. When the pressure-sensitive adhesive tape includes the base material, the elastic layer may be arranged between the pressure-sensitive adhesive layer and the base material. When the pressure-sensitive adhesive tape includes the elastic layer, its followability to an adherend is improved. In addition, when the pressure-sensitive adhesive tape including the elastic layer is heated at the time of peeling, the deformation (expansion) of the pressure-sensitive adhesive layer in its plane direction is restricted, and the deformation thereof in its thickness direction is dominant. As a result, peelability is improved.

The elastic layer contains a base polymer, and as the base polymer, the polymers given as examples of the base polymer for forming the pressure-sensitive adhesive layer may each be used. In one embodiment, the elastic layer may contain a natural rubber, a synthetic rubber, a synthetic resin, or the like. Examples of the synthetic rubber and the synthetic resin include: a nitrile-based, diene-based, or acrylic synthetic rubber; a polyolefin-based or polyester-based thermoplastic elastomer; an ethylene-vinyl acetate copolymer; polyurethane; polybutadiene; and a soft polyvinyl chloride. The base polymer for forming the elastic layer may be identical to or different from the base polymer for forming the pressure-sensitive adhesive layer. The elastic layer may be a foamed film formed from the base polymer. The foamed film may be obtained by any appropriate method. The elastic layer and the pressure-sensitive adhesive layer may be distinguished from each other on the basis of a difference between their base polymers and/or the presence or absence of the foaming agent (the elastic layer contains no foaming agent). More specifically, in the case where an interface between the elastic layer and the pressure-sensitive adhesive layer can be recognized by cross-sectional observation, such as the case where the elastic layer and the pressure-sensitive adhesive layer are formed from different base polymers, a boundary between the elastic layer and the pressure-sensitive adhesive layer is defined by the interface. In addition, in the case where the interface between the elastic layer and the pressure-sensitive adhesive layer cannot be recognized by cross-sectional observation, a region in which the foaming agent is observed by cross-sectional observation is the pressure-sensitive adhesive layer.

The elastic layer may contain any appropriate additive as required. Examples of the additive include a cross-linking agent, a vulcanizing agent, a tackifying resin, a plasticizer, a softener, a filler, and an age resistor. When a hard resin, such as polyvinyl chloride, is used as the base polymer, it is preferred that the plasticizer and/or the softener be used therewith to form an elastic layer having desired elasticity.

The thickness of the elastic layer is preferably from 3 μm to 200 μm, more preferably from 5 μm to 100 μm. When the thickness falls within such ranges, the above-mentioned function of the elastic layer can be sufficiently exhibited.

The tensile modulus of elasticity of the elastic layer at 25° C. is preferably from 0.2 MPa to 500 MPa, more preferably from 0.3 MPa to 500 MPa, still more preferably from 0.5 MPa to 500 MPa. When the tensile modulus of elasticity falls within such ranges, the above-mentioned function of the elastic layer can be sufficiently exhibited. The tensile modulus of elasticity may be measured in conformity with JIS K 7161:2008.

F. Separator

The pressure-sensitive adhesive tape of the present invention may further include a separator as required. At least one surface of the separator is a release surface, and the separator may be arranged in order to protect the pressure-sensitive adhesive layer. The separator may be formed from any appropriate material.

G. Method of Manufacturing Pressure-Sensitive Adhesive Tape

The pressure-sensitive adhesive tape of the present invention may be manufactured by any appropriate method. An example of the method of manufacturing the pressure-sensitive adhesive tape of the present invention is: a method involving directly applying a composition for forming the pressure-sensitive adhesive layer containing the pressure-sensitive adhesive and the thermally expandable microspheres onto the base material; or a method involving transferring, onto the base material, an applied layer formed by applying the composition for forming the pressure-sensitive adhesive layer onto any appropriate base. The composition for forming the pressure-sensitive adhesive layer may contain any appropriate solvent. In addition, the pressure-sensitive adhesive layer containing the thermally expandable microspheres may be formed by: forming a pressure-sensitive adhesive applied layer using a composition containing the pressure-sensitive adhesive; then sprinkling the thermally expandable microspheres over the pressure-sensitive adhesive applied layer; and then burying the thermally expandable microspheres into the applied layer using a laminator or the like.

The content ratio of the thermally expandable microspheres in the composition for forming the pressure-sensitive adhesive layer is preferably from 5 wt % to 95 wt %, more preferably from 10 wt % to 70 wt %, still more preferably from 10 wt % to 50 wt % with respect to the weight of the solid content of the composition for forming the pressure-sensitive adhesive layer.

When the pressure-sensitive adhesive tape includes the elastic layer, the elastic layer may be formed by, for example, applying a composition for forming the elastic layer onto the base material or the pressure-sensitive adhesive layer.

Any appropriate application method may be adopted as an application method for each of the above-mentioned compositions. For example, each layer may be formed by application, followed by drying. Examples of the application method include application methods each using a multi-coater, a die coater, a gravure coater, an applicator, or the like. As a drying method, there are given, for example, natural drying and drying by heating. When the drying by heating is performed, a heating temperature may be set to any appropriate temperature depending on the characteristics of a substance to be dried.

H. Application

The pressure-sensitive adhesive tape of the present invention may be suitably used as a sheet for temporarily fixing a material for an electronic part when the electronic part is manufactured and evaluated. In one embodiment, the pressure-sensitive adhesive tape of the present invention may be used as a pressure-sensitive adhesive tape for temporarily fixing a test body in a thermal shock test. In another embodiment, the pressure-sensitive adhesive tape of the present invention may be used as a pressure-sensitive adhesive tape for temporarily fixing a workpiece in a molding step (e.g., a molding step involving heating).

EXAMPLES

Now, the present invention is specifically described by way of Examples. However, the present invention is by no means limited to these Examples. Evaluation methods in Examples are as described below. In addition, the terms "part(s)" and "%" in Examples are by weight unless otherwise stated.

Evaluation (1) Initial Pressure-Sensitive Adhesive Strength

A pressure-sensitive adhesive tape was cut into a size having a width of 20 mm and a length of 140 mm, and a polyethylene terephthalate film (product name "Lumirror S-10" manufactured by Toray Industries, Inc., thickness: 25 μm, width: 20 mm) serving as an adherend was bonded to a pressure-sensitive adhesive layer by compression bonding through one pass back and forth with a 2 kg roller under an atmosphere at a temperature of 25° C. and a humidity of 65% RH in conformity with JIS Z 0237 (2000). Then, the pressure-sensitive adhesive tape with the adherend was set in a tensile tester with a constant temperature bath (product name "Shimadzu Autograph AG-120kN" manufactured by Shimadzu Corporation) set to 25° C. and allowed to stand for 30 minutes. After that, the load when the adherend was peeled off from the pressure-sensitive adhesive tape under the conditions of a peel angle of 180° and a peel rate (tensile rate) of 300 mm/min was measured, and the maximum load in this case (maximum value of a load excluding a peak top in the initial stage of measurement) was determined. The maximum load was defined as a pressure-sensitive adhesive strength (N/20 mm).

(2) Pressure-Sensitive Adhesive Strength after Heating at 140° C.

A pressure-sensitive adhesive tape was cut into a size having a width of 20 mm and a length of 140 mm, and a polyethylene terephthalate film (product name "Lumirror S-10" manufactured by Toray Industries, Inc., thickness: 25 μm, width: 20 mm) serving as an adherend was bonded to a pressure-sensitive adhesive layer by compression bonding through one pass back and forth with a 2 kg roller under an atmosphere at a temperature of 25° C. and a humidity of 65% RH in conformity with JIS Z 0237 (2000). Then, the pressure-sensitive adhesive tape with the adherend was placed under an environment at 140° C. for 30 minutes and then under an environment at 25° C. for 30 minutes.

After that, the pressure-sensitive adhesive strength was measured by the same method as in the section (1).

(3) Pressure-Sensitive Adhesive Strength after Heat Cycle

A pressure-sensitive adhesive tape was cut into a size having a width of 20 mm and a length of 140 mm, and a polyethylene terephthalate film (product name "Lumirror S-10" manufactured by Toray Industries, Inc., thickness: 25 μm, width: 20 mm) serving as an adherend was bonded to a pressure-sensitive adhesive layer by compression bonding through one pass back and forth with a 2 kg roller under an atmosphere at a temperature of 25° C. and a humidity of 65% RH in conformity with JIS Z 0237 (2000). Then, the pressure-sensitive adhesive tape with the adherend was placed under an environment at 140° C. for 30 minutes, then under an environment at 25° C. for 30 minutes, again under an environment at 140° C. for 30 minutes, and then under an environment at 25° C. for 30 minutes.

After that, the pressure-sensitive adhesive strength was measured by the same method as in the section (1).

(4) Outer Appearance after Heating at 140° C.

The pressure-sensitive adhesive tape was placed under an environment at 140° C. for 30 minutes and then under an environment at 25° C. for 30 minutes. After that, the outer appearance of the pressure-sensitive adhesive layer was visually observed. The case in which the outer appearance was satisfactory without foaming was evaluated as "pass" (indicated by Symbol "○" in Table 1), and the case in which the outer appearance was unsatisfactory while foaming occurred was evaluated as "fail" (indicated by Symbol "×" in Table 1).

(5) Outer Appearance after Heat Cycle

The pressure-sensitive adhesive tape was placed under an environment at 140° C. for 30 minutes, then under an environment at 25° C. for 30 minutes, again under an environment at 140° C. for 30 minutes, and then under an environment at 25° C. for 30 minutes. After that, the outer appearance of the pressure-sensitive adhesive layer was visually observed. The case in which the outer appearance was satisfactory without foaming was evaluated as "pass" (indicated by Symbol "○" in Table 1), and the case in which the outer appearance was unsatisfactory while foaming occurred was evaluated as "fail" (indicated by Symbol "×" in Table 1).

(6) Package Retention Ratio

A QFN lead frame (size: 125 mm×65 mm; a bonding surface to a pressure-sensitive adhesive tape was a resin surface (surface roughness Ra: 3 µm)) sealed with an epoxy resin (product name "CEL-9200HF9" manufactured by Hitachi Chemical Company, Ltd.) was bonded to the pressure-sensitive adhesive layer of the pressure-sensitive adhesive tape. The resultant was mounted and fixed to a 6-inch dicing ring, and then fully cut into 250 chips each having a size of 5 mm×5 mm via a dicer (cut processing by dicing was performed). Next, under a state in which the bonding surface of the adherend was placed upward, the resultant was placed under an environment at 140° C. for 30 minutes, then under an environment at 25° C. for 30 minutes, again under an environment at 140° C. for 30 minutes, and then under an environment at 25° C. for 30 minutes. Then, the pressure-sensitive adhesive tape with the adherend was inverted, and a package retention ratio was evaluated from the number of packages remaining on the pressure-sensitive adhesive layer.

[Production Example 1] Production of Thermally Expandable Microspheres A

150 Parts by weight of sodium chloride, 70 parts by weight of colloidal silica (product name "Snowtex" manufactured by Nissan Chemical Corporation) containing 20 wt % of a silica active ingredient, 1 part by weight of polyvinylpyrrolidone, and 0.5 part by weight of a condensate of diethanolamine and adipic acid were added to 600 parts by weight of distilled water. After that, the pH of the obtained mixture was adjusted to from 2.8 to 3.2 to obtain an aqueous solution.

To the aqueous solution, 70 parts by weight of acrylonitrile and 180 parts by weight of methacrylic acid were added as an oil-based additive serving as a material for a shell. Further, 1 part by weight of ethylene glycol dimethacrylate serving as a cross-linking agent was added thereto to obtain a reaction solution.

The reaction solution was added to a pressure-resistant reaction vessel with a homomixer (product name "TK homomixer" manufactured by Tokushu Kika Kogyo Co., Ltd.). Further, 20 parts by weight of isopentane (boiling point: 27.7° C.) and 55 parts by weight of isooctane (boiling point: 99° C.) serving as organic solvents intended to be contained in the shell, and 5 parts by weight of an initiator (diisopropyloxydicarbonate) were added to the pressure-resistant reaction vessel.

The homomixer was rotated under predetermined initial stirring conditions (stirring speed: 6,000 rpm, stirring time: 2 minutes) to stir the mixture, and then the mixture was heated to 60° C. under stirring at 80 rpm to perform a reaction for 24 hours. A solid content obtained by filtering the reaction solution after the reaction was allowed to stand at room temperature for 1 week under a nitrogen stream to obtain thermally expandable microspheres.

The obtained thermally expandable microspheres had an average particle diameter of 30 µm when measured with product name "SALD-2000J" manufactured by Shimadzu Corporation. In addition, it was found by X-ray CT (Xradia520versa manufactured by Carl Zeiss, Co., Ltd. (measurement conditions: tube voltage of 60 KV, tube current of 83 µA, pixel size of 0.20 µm/pixel) that the solvents in the thermally expandable microspheres were isopentane and isooctane and that the solvents were contained at 15 wt % with respect to the weight of the thermally expandable microspheres. In addition, according to the measurement by the X-ray CT, the thickness of the shell of each of the thermally expandable microsphere was 2.5 µm.

[Production Examples 2 to 10] Thermally Expandable Microspheres B to J

Thermally expandable microspheres B to J were produced in the same manner as in Production Example 1 except that the kinds of the organic solvents intended to be contained in the shell, and the composition of the oil-based additive (acrylonitrile, methacrylic acid, methacrylonitrile, methyl methacrylate) were set as shown in Table 1. In addition, the average particle diameter of the thermally expandable microspheres, the amount of the contained organic solvents, and the thickness of the shell were measured in the same manner as in Production Example 1. The results are shown in Table 1.

TABLE 1

| | | Production Example 1 Thermally expandable microspheres A | Production Example 2 Thermally expandable microspheres B | Production Example 3 Thermally expandable microspheres C | Production Example 4 Thermally expandable microspheres D | Production Example 5 Thermally expandable microspheres E | Production Example 6 Thermally expandable microspheres F |
|---|---|---|---|---|---|---|---|
| Oil-based additive (material for forming shell) | Acrylonitrile [parts by weight] | 70 | | | 190 | | 25 |
| | Methacrylonitrile [parts by weight] | | 190 | 50 | | 230 | |
| | Methyl methacrylate [parts by weight] | | | 50 | | | |
| | Methacrylic acid [parts by weight] | 180 | 60 | 150 | 60 | 20 | 225 |
| Organic solvent (organic solvent contained in shell) | Isobutane [parts by weight] | | | | | | |
| | Isopentane [parts by weight] | 20 | 20 | | 20 | 20 | |
| | Isooctane [parts by weight] | 55 | | | | 50 | |
| | Pentane [parts by weight] | | 60 | 30 | | | 70 |
| | Hexane [parts by weight] | | | | | | |
| | Cyclohexane [parts by weight] | | | 60 | 50 | | |
| Characteristics | Content ratio of solvent [wt %] | 15 | 18 | 20 | 14 | 17 | 18 |

TABLE 1-continued

| | | | | | | | |
|---|---|---|---|---|---|---|---|
| of thermally | Average particle diameter [μm] | 30 | 15 | 20 | 18 | 15 | 25 |
| expandable | Shell | Thickness [μm] | 2.5 | 2.1 | 2 | 3 | 2 | 3 |
| microspheres | | Tg of constituent resin [°C.] | 182 | 135 | 170 | 123 | 126 | 211 |
| | | Content ratio of constituent unit having carboxyl group [wt %] | 72 | 23 | 57 | 25 | 7 | 90 |
| | Boiling point of contained organic solvent (°C.) | 63.5 | 32.5 | 59 | 54.5 | 99 | 63.5 |
| | Foaming temperature [°C.] | 200 | 170 | 190 | 150 | 150 | 230 |

| | | Production Example 7 Thermally expandable microspheres G | Production Example 8 Thermally expandable microspheres H | Production Example 9 Thermally expandable microspheres I | Production Example 10 Thermally expandable microspheres J |
|---|---|---|---|---|---|
| Oil-based additive (material for forming shell) | Acrylonitrile [parts by weight] | 110 | 105 | 242 | 8 |
| | Methacrylonitrile [parts by weight] | | 145 | | |
| | Methyl methacrylate [parts by weight] | 140 | | | |
| | Methacrylic acid [parts by weight] | | | 8 | 245 |
| Organic solvent (organic solvent contained in shell) | Isobutane [parts by weight] | 45 | | | |
| | Isopentane [parts by weight] | | 20 | 15 | |
| | Isooctane [parts by weight] | | | | |
| | Pentane [parts by weight] | 15 | | | 70 |
| | Hexane [parts by weight] | 10 | | | |
| | Cyclohexane [parts by weight] | | 70 | 55 | |
| Characteristics of thermally expandable microspheres | Content ratio of solvent [wt %] | 18 | 24 | 13 | 16 |
| | Average particle diameter [μm] | 20 | 12 | 24 | 40 |
| | Shell Thickness [μm] | 2.2 | 2.3 | 3 | 3 |
| | Tg of constituent resin [°C.] | 101 | 116 | 100 | 223 |
| | Content ratio of constituent unit having carboxyl group [wt %] | 0 | 0 | 3 | 97 |
| | Boiling point of contained organic solvent (°C.) | 31.3 | 54.5 | 54.5 | 99 |
| | Foaming temperature [°C.] | 120 | 160 | 150 | 240 |

Example 1

(Preparation of Composition for Forming Elastic Layer)

100 Parts by weight of an acrylic copolymer (copolymer of 2-ethylhexyl acrylate (2EHA), ethyl acrylate (EA), methyl methacrylate (MMA), and 2-hydroxyethyl acrylate (HEA), 2EHA constituent unit:EA constituent unit:MMA constituent unit:HEA constituent unit=30:70:5:5 (weight ratio)), 1 part by weight of an isocyanate-based cross-linking agent (product name "Coronate L" manufactured by Tosoh Corporation), and toluene were mixed to prepare a composition for forming an elastic layer.

(Preparation of Composition for Forming Pressure-Sensitive Adhesive Layer)

100 Parts by weight of an acrylic copolymer (copolymer of 2-ethylhexyl acrylate (2EHA), ethyl acrylate (EA), methyl methacrylate (MMA), and 2-hydroxyethyl acrylate (HEA), 2EHA constituent unit:EA constituent unit:MMA constituent unit:HEA constituent unit=30:70:5:5 (weight ratio)), 10 parts by weight of a tackifier (product name "Mighty Ace G125" manufactured by Yasuhara Chemical Co., Ltd.), 2 parts by weight of an isocyanate-based cross-linking agent (product name "Coronate L" manufactured by Tosoh Corporation), 30 parts by weight of the thermally expandable microspheres A, and toluene were mixed to prepare a composition for forming a pressure-sensitive adhesive layer.

(Production of Pressure-Sensitive Adhesive Tape)

The composition for forming an elastic layer was applied onto a PET film (product name "Lumirror S-10" manufactured by Toray Industries, Inc., thickness: 100 μm) serving as a base material and dried to form an elastic layer (thickness: 15 μm) on the base material.

The composition for forming a pressure-sensitive adhesive layer was applied onto a polyethylene terephthalate film with a silicone release agent-treated surface (product name "MRF38" manufactured by Mitsubishi Chemical Polyester Film Co., Ltd.) and dried to form a pressure-sensitive adhesive layer (35 μm) on the polyethylene terephthalate film.

The pressure-sensitive adhesive layer formed on the polyethylene terephthalate film was transferred onto the elastic layer to obtain a pressure-sensitive adhesive tape including the base material, the elastic layer, and the pressure-sensitive adhesive layer in the stated order. The obtained pressure-sensitive adhesive tape was subjected to the above-mentioned evaluations (1) to (6). The results are shown in Table 5.

Examples 2 to 8, Example 11, and Comparative Examples 1 to 3

Pressure-sensitive adhesive tapes were obtained in the same manner as in Example 1 except that the compositions of the composition for forming an elastic layer (the composition of a base polymer and the amount of a cross-linking agent) and the composition for forming a pressure-sensitive adhesive layer (the composition of a base polymer, the kind of a cross-linking agent, the amount of the cross-linking agent, and the kind of thermally expandable microspheres) were set to those shown in Tables 2 to 4. Each of the obtained pressure-sensitive adhesive tapes was subjected to the above-mentioned evaluations (1) to (6). The results are shown in Table 5. In the table, "cross-linking agent Tetrad C" is an epoxy-based cross-linking agent (product name "Tetrad C") manufactured by Mitsubishi Gas Chemical Company, Inc.

In Example 11, the "outer appearance after heating at 140° C." and "outer appearance after heat cycle" were satisfactory without foaming. However, minute unevenness was observed on the surface to such a degree as not to significantly influence the pressure-sensitive adhesive strength from the stage before the evaluation (accordingly, the evaluation result is indicated by Symbol "Δ").

Example 9

A composition for forming an elastic layer and a composition for forming a pressure-sensitive adhesive layer were prepared in the same manner as in Example 1.

Further, 100 parts by weight of an acrylic copolymer (copolymer of 2-ethylhexyl acrylate (2EHA), ethyl acrylate (EA), methyl methacrylate (MMA), and 2-hydroxyethyl acrylate (HEA), 2EHA constituent unit:EA constituent unit: MMA constituent unit:HEA constituent unit=30:70:5:5 (weight ratio)), 10 parts by weight of a tackifier (product name "Mighty Ace G125" manufactured by Yasuhara Chemical Co., Ltd.), 3 parts by weight of an isocyanate-based cross-linking agent (product name "Coronate L" manufactured by Tosoh Corporation), and toluene were mixed to prepare a composition for forming another pressure-sensitive adhesive layer.

The composition for forming an elastic layer was applied onto a PET film (product name "Lumirror S-10" manufactured by Toray Industries, Inc., thickness: 100 μm) serving as a base material and dried to form an elastic layer (thickness: 15 μm) on the base material.

The composition for forming a pressure-sensitive adhesive layer was applied onto a polyethylene terephthalate film with a silicone release agent-treated surface (product name "MRF38" manufactured by Mitsubishi Chemical Polyester Film Co., Ltd.) and dried to form a pressure-sensitive adhesive layer (35 μm) on the polyethylene terephthalate film.

In addition, the composition for forming another pressure-sensitive adhesive layer was applied onto a polyethylene terephthalate film with a silicone release agent-treated surface (product name "MRF38" manufactured by Mitsubishi Chemical Polyester Film Co., Ltd.) and dried to form another pressure-sensitive adhesive layer (10 μm) on the polyethylene terephthalate film.

The pressure-sensitive adhesive layer formed on the polyethylene terephthalate film was transferred onto the elastic layer, and the other pressure-sensitive adhesive layer was transferred onto a surface of the base material on which the elastic layer was not formed, to thereby obtain a pressure-sensitive adhesive tape including the other pressure-sensitive adhesive layer, the base material, the elastic layer, and the pressure-sensitive adhesive layer in the stated order The obtained pressure-sensitive adhesive tape was subjected to the above-mentioned evaluations (1) to (6). The results are shown in Table 5.

Example 10

(Preparation of Composition for Forming Silicone-Based Pressure-Sensitive Adhesive Layer)

100 Parts by weight of an addition reaction type silicone-based pressure-sensitive adhesive (product name "Silicone Rubber SD-4580L" manufactured by Toray Industries, Inc., silicone rubber:silicone resin=60:40 (weight ratio)), 0.5 part by weight of a platinum-based catalyst (product name "SRX-212" manufactured by Toray Industries, Inc.), 30 parts by weight of the thermally expandable microspheres A, and 100 parts by weight of toluene were mixed to prepare a composition for forming a pressure-sensitive adhesive layer.
(Production of Pressure-Sensitive Adhesive Tape)

The composition for forming a silicone-based pressure-sensitive adhesive layer was applied onto a polyimide film (product name "Kapton 200H" manufactured by Du Pont-Toray Co., Ltd., thickness: 50 μm) serving as a base material layer and dried to form a pressure-sensitive adhesive layer (thickness: 30 μm) on the base material, to thereby obtain a pressure-sensitive adhesive tape.

The obtained pressure-sensitive adhesive tape was subjected to the above-mentioned evaluations (1) to (6). The results are shown in Table 5.

TABLE 2

| | | | | | Example 1 | Example 2 | Example 3 |
|---|---|---|---|---|---|---|---|
| Pressure-sensitive adhesive layer | Pressure-sensitive adhesive | Base polymer | Monomer blending ratio | 2EHA (2-ethylhexyl acrylate) | 30 | 30 | 30 |
| | | | | BA (butyl acrylate) | | | |
| | | | | EA (ethyl acrylate) | 70 | 70 | 70 |
| | | | | MMA (methyl methacrylate) | 5 | 5 | 5 |
| | | | | HEA (2-hydroxyethyl acrylate) | 5 | 5 | 5 |
| | | | | AA (acrylic acid) | | | |
| | | | Composition | Base polymer (parts by weight) | 100 | 100 | 100 |
| | | | | Cross-linking agent Coronate L (parts by weight) | 2 | 2 | 2 |
| | | | | Cross-linking agent Tetrad C (parts by weight) | | | |
| | | | | Tackifier Mighty Ace G125 (parts by weight) | 10 | 10 | 10 |

TABLE 2-continued

| | | | | | Thermally expandable microspheres A | Thermally expandable microspheres B | Thermally expandable microspheres C |
|---|---|---|---|---|---|---|---|
| | Thermally expandable microspheres | Kind | | | | | |
| | | | Blending amount of thermally expandable microspheres (parts by weight) | | 30 | 30 | 30 |
| | | | Thickness of pressure-sensitive adhesive layer (μm) | | 35 | 35 | 35 |
| Elastic layer | Base polymer | Monomer blending ratio | 2EHA (2-ethylhexyl acrylate) | | 30 | 30 | 30 |
| | | | BA (butyl acrylate) | | | | |
| | | | EA (ethyl acrylate) | | 70 | 70 | 70 |
| | | | MMA (methyl methacrylate) | | 5 | 5 | 5 |
| | | | HEA (2-hydroxyethyl acrylate) | | 5 | 5 | 5 |
| | | | AA (acrylic acid) | | | | |
| | Composition | | Base polymer (parts by weight) | | 100 | 100 | 100 |
| | | | Cross-linking agent Coronate L (parts by weight) | | 1 | 1 | 1 |
| Base material | | Base material | | | PET | PET | PET |
| | | Thickness of base material (μm) | | | 100 | 100 | 100 |
| | | Configuration | | | One sided | One sided | One sided |

| | | | | | Example 4 | Example 5 |
|---|---|---|---|---|---|---|
| Pressure-sensitive adhesive layer | Pressure-sensitive adhesive | Base polymer | Monomer blending ratio | 2EHA (2-ethylhexyl acrylate) | 30 | 30 |
| | | | | BA (butyl acrylate) | | |
| | | | | EA (ethyl acrylate) | 70 | 70 |
| | | | | MMA (methyl methacrylate) | 5 | 5 |
| | | | | HEA (2-hydroxyethyl acrylate) | 5 | 5 |
| | | | | AA (acrylic acid) | | |
| | | Composition | Base polymer (parts by weight) | | 100 | 100 |
| | | | Cross-linking agent Coronate L (parts by weight) | | 2 | 2 |
| | | | Cross-linking agent Tetrad C (parts by weight) | | | |
| | | | Tackifier Mighty Ace G125 (parts by weight) | | 10 | 10 |
| | Thermally expandable microspheres | | Kind | | Thermally expandable microspheres D | Thermally expandable microspheres E |
| | | | Blending amount of thermally expandable microspheres (parts by weight) | | 30 | 30 |
| | | | Thickness of pressure-sensitive adhesive layer (μm) | | 35 | 35 |
| Elastic layer | Base polymer | Monomer blending ratio | 2EHA (2-ethylhexyl acrylate) | | 30 | 30 |
| | | | BA (butyl acrylate) | | | |
| | | | EA (ethyl acrylate) | | 70 | 70 |
| | | | MMA (methyl methacrylate) | | 5 | 5 |
| | | | HEA (2-hydroxyethyl acrylate) | | 5 | 5 |
| | | | AA (acrylic acid) | | | |
| | Composition | | Base polymer (parts by weight) | | 100 | 100 |
| | | | Cross-linking agent Coronate L (parts by weight) | | 1 | 1 |
| Base material | | Base material | | | PET | PET |
| | | Thickness of base material (μm) | | | 100 | 100 |
| | | Configuration | | | One sided | One sided |

TABLE 3

| | | | | | Example 6 | Example 7 | Example 8 |
|---|---|---|---|---|---|---|---|
| Pressure-sensitive | Pressure-sensitive | Base polymer | Monomer blending | 2EHA (2-ethylhexyl acrylate) | 30 | 95 | |

TABLE 3-continued

| | | | | | | | |
|---|---|---|---|---|---|---|---|
| adhesive layer | adhesive | ratio | | BA (butyl acrylate) | | | 95 |
| | | | | EA (ethyl acrylate) | 70 | | |
| | | | | MMA (methyl methacrylate) | 5 | | |
| | | | | HEA (2-hydroxyethyl acrylate) | 5 | 5 | |
| | | | | AA (acrylic acid) | | | 5 |
| | | Composition | | Base polymer (parts by weight) | 100 | 100 | 100 |
| | | | | Cross-linking agent Coronate L (parts by weight) | 2 | 2 | |
| | | | | Cross-linking agent Tetrad C (parts by weight) | | | 0.5 |
| | | | | Tackifier Mighty Ace G125 (parts by weight) | 10 | 10 | 10 |
| | Thermally expandable microspheres | | | Kind | Thermally expandable microspheres F | Thermally expandable microspheres A | Thermally expandable microspheres A |
| | | | Blending amount of thermally expandable microspheres (parts by weight) | | 30 | 30 | 30 |
| | | | Thickness of pressure-sensitive adhesive layer (μm) | | 35 | 35 | 35 |
| Elastic layer | Base polymer | Monomer blending ratio | | 2EHA (2-ethylhexyl acrylate) | 30 | 95 | |
| | | | | BA (butyl acrylate) | | | 95 |
| | | | | EA (ethyl acrylate) | 70 | | |
| | | | | MMA (methyl methacrylate) | 5 | | |
| | | | | HEA (2-hydroxyethyl acrylate) | 5 | 5 | |
| | | | | AA (acrylic acid) | | | 5 |
| | | Composition | | Base polymer (parts by weight) | 100 | 100 | 100 |
| | | | | Cross-linking agent Coronate L (parts by weight) | 1 | 1 | 3 |
| Base material | | | Base material | | PET | PET | PET |
| | | | Thickness of base material (μm) | | 100 | 100 | 100 |
| | | | Configuration | | One sided | One sided | One sided |

| | | | | | Example 9 | Example 10 | Example 11 |
|---|---|---|---|---|---|---|---|
| Pressure-sensitive adhesive layer | Pressure-sensitive adhesive | Base polymer | Monomer blending ratio | 2EHA (2-ethylhexyl acrylate) | 30 | Silicone-based pressure-sensitive adhesive (Silicone Rubber SD-4580L) | 30 |
| | | | | BA (butyl acrylate) | | | |
| | | | | EA (ethyl acrylate) | 70 | | 70 |
| | | | | MMA (methyl methacrylate) | 5 | | 5 |
| | | | | HEA (2-hydroxyethyl acrylate) | 5 | | 5 |
| | | | | AA (acrylic acid) | | | |
| | | Composition | | Base polymer (parts by weight) | 100 | | 100 |
| | | | | Cross-linking agent Coronate L (parts by weight) | 2 | | 1.5 |
| | | | | Cross-linking agent Tetrad C (parts by weight) | | | |
| | | | | Tackifier Mighty Ace G125 (parts by weight) | 10 | | 10 |
| | Thermally expandable microspheres | | | Kind | Thermally expandable microspheres A | Thermally expandable microspheres A | Thermally expandable microspheres J |
| | | | Blending amount of thermally expandable microspheres (parts by weight) | | 30 | 30 | 30 |
| | | | Thickness of pressure-sensitive adhesive layer (μm) | | 35 | 30 | 35 |
| Elastic layer | Base polymer | Monomer blending ratio | | 2EHA (2-ethylhexyl acrylate) | 30 | None | 30 |
| | | | | BA (butyl acrylate) | | | |
| | | | | EA (ethyl acrylate) | 70 | | 70 |
| | | | | MMA (methyl methacrylate) | 5 | | 5 |
| | | | | HEA (2-hydroxyethyl acrylate) | 5 | | 5 |
| | | | | AA (acrylic acid) | | | |
| | | Composition | | Base polymer (parts by weight) | 100 | | 100 |
| | | | | Cross-linking agent Coronate L (parts by weight) | 1 | | 1 |

TABLE 3-continued

| Base material | Base material | PET | PI | PET |
|---|---|---|---|---|
| | Thickness of base material (μm) | 100 | 50 | 100 |
| | Configuration | Double sided | One sided | One sided |

TABLE 4

| | | | | | | Comparative Example 1 | Comparative Example 2 | Comparative Example 3 |
|---|---|---|---|---|---|---|---|---|
| Pressure-sensitive adhesive layer | Pressure-sensitive adhesive | Base polymer | Monomer blending ratio | 2EHA (2-ethylhexyl acrylate) | | 30 | 30 | 30 |
| | | | | BA (butyl acrylate) | | | | |
| | | | | EA (ethyl acrylate) | | 70 | 70 | 70 |
| | | | | MMA (methyl methacrylate) | | 5 | 5 | 5 |
| | | | | HEA (2-hydroxyethyl acrylate) | | 5 | 5 | 5 |
| | | | | AA (acrylic acid) | | | | |
| | | Composition | | Base polymer (parts by weight) | | 100 | 100 | 100 |
| | | | | Cross-linking agent Coronate L (parts by weight) | | 1.5 | 1.5 | 1.5 |
| | | | | Tackifier Mighty Ace G125 (parts by weight) | | 10 | 10 | 10 |
| | Thermally expandable microspheres | | | Kind | | Thermally expandable microspheres G | Thermally expandable microspheres H | Thermally expandable microspheres I |
| | | | Blending amount of thermally expandable microspheres (parts by weight) | | | 30 | 30 | 30 |
| | | | Thickness of pressure-sensitive adhesive layer (μm) | | | 35 | 35 | 35 |
| Elastic layer | Base polymer | | Monomer blending ratio | 2EHA (2-ethylhexyl acrylate) | | 30 | 30 | 30 |
| | | | | BA (butyl acrylate) | | | | |
| | | | | EA (ethyl acrylate) | | 70 | 70 | 70 |
| | | | | MMA (methyl methacrylate) | | 5 | 5 | 5 |
| | | | | HEA (2-hydroxyethyl acrylate) | | 5 | 5 | 5 |
| | | | | AA (acrylic acid) | | | | |
| | Composition | | | Base polymer (parts by weight) | | 100 | 100 | 100 |
| | | | | Cross-linking agent Coronate L (parts by weight) | | 1 | 1 | 1 |
| Base material | | | Base material | | | PET | PET | PET |
| | | | Thickness of base material (μm) | | | 100 | 100 | 100 |
| | | | Configuration | | | One sided | One sided | One sided |

TABLE 5

| | Example 1 | Example 2 | Example 3 | Example 4 | Example 5 |
|---|---|---|---|---|---|
| Glass transition temperature of resin for forming shell (Tg) [° C.] | 182 | 135 | 170 | 123 | 126 |
| Content ratio of constituent unit having carboxyl group [wt %] | 72 | 23 | 57 | 25 | 7 |
| Initial pressure-sensitive adhesive strength [N/20 mm] | 5.2 | 5 | 5.1 | 5 | 4.9 |
| Outer appearance after heating at 140° C. | ○ | ○ | ○ | ○ | ○ |
| Pressure-sensitive adhesive strength after heating at 140° C. [N/20 mm] | 5.2 | 5.1 | 5.1 | 5 | 5.1 |
| Pressure-sensitive adhesive strength maintenance ratio after heating at 140° C. [%] | 100 | 102 | 100 | 100 | 104 |

TABLE 5-continued

|  |  |  |  |  |  |
|---|---|---|---|---|---|
| Outer appearance after heat cycle | ○ | ○ | ○ | ○ | ○ |
| Pressure-sensitive adhesive strength after heat cycle | 5.2 | 5.2 | 5 | 5.1 | 5 |
| Pressure-sensitive adhesive strength maintenance ratio after heat cycle [%] | 100 | 104 | 98 | 102 | 102 |
| Chip retention ratio [%] | 100 | 100 | 100 | 100 | 100 |

|  | Example 6 | Example 7 | Example 8 | Example 9 | Example 10 | Example 11 |
|---|---|---|---|---|---|---|
| Glass transition temperature of resin for forming shell (Tg) [° C.] | 211 | 182 | 182 | 182 | 182 | 223 |
| Content ratio of constituent unit having carboxyl group [wt %] | 90 | 73 | 73 | 73 | 73 | 97 |
| Initial pressure-sensitive adhesive strength [N/20 mm] | 5.3 | 1 | 7.3 | 5.2 | 0.6 | 4.4 |
| Outer appearance after heating at 140° C. | ○ | ○ | ○ | ○ | ○ | Δ |
| Pressure-sensitive adhesive strength after heating at 140° C. [N/20 mm] | 5.4 | 1.1 | 7.4 | 5.2 | 0.5 | 4.5 |
| Pressure-sensitive adhesive strength maintenance ratio after heating at 140° C. [%] | 102 | 110 | 101 | 100 | 83 | 102 |
| Outer appearance after heat cycle | ○ | ○ | ○ | ○ | ○ | Δ |
| Pressure-sensitive adhesive strength after heat cycle | 5.4 | 1.1 | 7.4 | 5.2 | 0.6 | 4.4 |
| Pressure-sensitive adhesive strength maintenance ratio after heat cycle [%] | 102 | 110 | 101 | 100 | 100 | 100 |
| Chip retention ratio [%] | 100 | 100 | 100 | 100 | 100 | 100 |

|  | Comparative Example 1 | Comparative Example 2 | Comparative Example 3 |
|---|---|---|---|
| Glass transition temperature of resin for forming shell (Tg) [° C.] | 101 | 116 | 100 |
| Content ratio of constituent unit having carboxyl group [wt %] | 0 | 0 | 3 |
| Initial pressure-sensitive adhesive strength [N/20 mm] | 4.5 | 4.4 | 4.7 |
| Outer appearance after heating at 140° C. | x (Foaming) | ○ | ○ |
| Pressure-sensitive adhesive strength after heating at 140° C. [N/20 mm] | 0.1 | 4.5 | 4.8 |
| Pressure-sensitive adhesive strength maintenance ratio after heating at 140° C. [%] | 2 | 102 | 102 |
| Outer appearance after heat Cycle | x (Foaming) | x (Foaming) | x (Foaming) |
| Pressure-sensitive adhesive strength after heat cycle | 0.1 | 0.1 | 0.1 |
| Pressure-sensitive adhesive strength maintenance ratio after heat cycle [%] | 2 | 2 | 2 |
| Chip Retention ratio [%] | 0 | 0 | 0 |

REFERENCE SIGNS LIST

10 pressure-sensitive adhesive layer
20 base material
100 pressure-sensitive adhesive tape

The invention claimed is:

1. A pressure-sensitive adhesive tape, comprising a base material and a pressure-sensitive adhesive layer including thermally expandable microspheres and an acrylic pressure-sensitive adhesive, wherein the base material is a resin sheet consisting of polyethylene terephthalate (PET), polyethylene naphthalate (PEN), polybutylene terephthalate (PBT), polyethylene (PE), polypropylene (PP), an ethylene-propylene copolymer, an ethylene-vinyl acetate copolymer (EVA), polyamide (nylon), wholly aromatic polyamide (aramid), polyimide (PI), polyvinyl chloride (PVC), polyphenylene sulfide (PPS), a fluorine-based resin, or polyether ether ketone (PEEK), wherein the thermally expandable microspheres are each formed of a shell and a volatile substance contained in the shell, wherein the volatile substance includes at least one of isopentane or isooctane, wherein the shell is formed of a resin having a glass transition temperature (Tg) of 120° C. or more, wherein the resin for forming the shell contains a constituent unit having a carboxyl group, wherein a difference (Tg–bp) between a boiling point (bp) of the volatile substance and the glass transition temperature (Tg) of the resin for forming the shell is 50° C. to 150° C., and wherein a pressure-sensitive adhesive strength "c" of the pressure-sensitive adhesive tape, when a pressure-sensitive adhesive surface of the pressure-sensitive adhesive tape is bonded to a polyethylene terephthalate film after a cycle involving heating to 140° C. and then cooling to 25° C. is performed twice, is 50% or more with respect to an initial pressure-sensitive adhesive strength "a" of the pressure-sensitive adhesive tape, when the pressure-sensitive adhesive surface of the pressure-sensitive adhesive tape is bonded to the polyethylene terephthalate film under an ambient temperature of 25° C.

2. The pressure-sensitive adhesive tape according to claim 1, wherein a content ratio of the constituent unit having a carboxyl group is from 5 parts by weight to 97 parts by weight with respect to 100 parts by weight of the resin.

3. The pressure-sensitive adhesive tape according to claim 2, wherein a pressure-sensitive adhesive strength "b" of the pressure-sensitive adhesive tape, when a pressure-sensitive adhesive surface of the pressure-sensitive adhesive tape is bonded to a polyethylene terephthalate film after the pressure-sensitive adhesive tape is heated to 140° C. and then cooled to 25° C., is 50% or more with respect to an initial pressure-sensitive adhesive strength "a" of the pressure-sensitive adhesive tape, when the pressure-sensitive adhesive surface of the pressure-sensitive adhesive tape is bonded to the polyethylene terephthalate film under an ambient temperature of 25° C.

4. The pressure-sensitive adhesive tape according to claim 1, wherein an initial pressure-sensitive adhesive strength "a" of the pressure-sensitive adhesive tape, when a pressure-sensitive adhesive surface of the pressure-sensitive adhesive tape is bonded to a polyethylene terephthalate film under an ambient temperature of 25° C., is from 0.5 N/20 mm to 20 N/20 mm.

5. The pressure-sensitive adhesive tape according to claim 1, wherein a pressure-sensitive adhesive strength "b" of the pressure-sensitive adhesive tape, when a pressure-sensitive adhesive surface of the pressure-sensitive adhesive tape is bonded to a polyethylene terephthalate film after the pressure-sensitive adhesive tape is heated to 140° C. and then cooled to 25° C., is 50% or more with respect to an initial pressure-sensitive adhesive strength "a" of the pressure-sensitive adhesive tape, when the pressure-sensitive adhesive surface of the pressure-sensitive adhesive tape is bonded to the polyethylene terephthalate film under an ambient temperature of 25° C.

6. The pressure-sensitive adhesive tape according to claim 1, further comprising a second pressure-sensitive adhesive layer, wherein the base material is arranged between the pressure-sensitive adhesive layer and the second pressure-sensitive adhesive layer.

* * * * *